(12) United States Patent
Zhao et al.

(10) Patent No.: US 11,329,604 B2
(45) Date of Patent: May 10, 2022

(54) METHOD FOR PHOTOVOLTAIC MODULE FAULT DIAGNOSIS, EDGE CALCULATION PROCESSING DEVICE, AND INVERTER

(71) Applicant: SUNGROW POWER SUPPLY CO., LTD., Anhui (CN)

(72) Inventors: Tian Zhao, Anhui (CN); Ping Yun, Anhui (CN); Jie Weng, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 354 days.

(21) Appl. No.: 16/544,546

(22) Filed: Aug. 19, 2019

(65) Prior Publication Data

US 2020/0204111 A1 Jun. 25, 2020

(30) Foreign Application Priority Data

Dec. 24, 2018 (CN) .......................... 201811582678.X

(51) Int. Cl.
*G01R 31/26* (2020.01)
*H02S 50/00* (2014.01)
(Continued)

(52) U.S. Cl.
CPC .............. *H02S 50/00* (2013.01); *H02S 40/32* (2014.12); *H02S 50/10* (2014.12); *Y02E 10/50* (2013.01)

(58) Field of Classification Search
CPC .......... H02S 50/10; H02S 50/00; H02S 50/15; H02S 10/00; H02S 40/32; Y02E 10/50; Y02E 10/56; Y02E 10/52; Y02E 10/547
(Continued)

(56) References Cited

U.S. PATENT DOCUMENTS

2010/0282289 A1 11/2010 Wu et al.
2014/0117999 A1* 5/2014 Shigemura ............. G01R 31/11
324/533
(Continued)

FOREIGN PATENT DOCUMENTS

| CN | 105827200 A | 8/2016 |
| CN | 107017836 A | 8/2017 |
| CN | 108973979 A | 12/2018 |

OTHER PUBLICATIONS

Second Australian Office Action regarding Application No. 2019216664 dated Aug. 13, 2020.
(Continued)

*Primary Examiner* — Raul J Rios Russo
(74) *Attorney, Agent, or Firm* — Harness, Dickey & Pierce, P.L.C.

(57) ABSTRACT

Provided are a method for photovoltaic module fault diagnosis, an edge calculation processing device and an inverter. Firstly, multiple module-level power electronic devices are controlled to perform IV scanning on photovoltaic modules connected to the module-level power electronic devices respectively and IV curves of the photovoltaic modules are obtained by the module-level power electronic devices respectively. Secondly, an IV curve satisfying a condition is selected from the IV curves of the photovoltaic modules as a reference curve. Thirdly, each of remaining IV curves in the IV curves of the photovoltaic modules other than the reference curve is compared with the reference curve, to generate comparison results. Finally, a fault diagnosis result for each of the photovoltaic modules is generated based on the comparison results.

12 Claims, 10 Drawing Sheets

(51) Int. Cl.
*H02S 40/32* (2014.01)
*H02S 50/10* (2014.01)

(58) Field of Classification Search
USPC ......... 324/71, 378, 403, 415, 425, 500, 537,
324/761.01
See application file for complete search history.

(56) References Cited

U.S. PATENT DOCUMENTS

| | | |
|---|---|---|
| 2015/0039270 A1 | 2/2015 | Long et al. |
| 2016/0365733 A1 | 12/2016 | Judkins et al. |
| 2018/0159468 A1* | 6/2018 | Trupke ............... G01N 21/9501 |
| 2018/0159469 A1* | 6/2018 | Trupke ................... H02S 50/15 |
| 2018/0234051 A1 | 8/2018 | Ni et al. |
| 2018/0375471 A1 | 12/2018 | Yang et al. |
| 2019/0123684 A1* | 4/2019 | Ha ......................... H01L 31/044 |
| 2019/0386611 A1* | 12/2019 | Tao ......................... H02S 50/10 |

OTHER PUBLICATIONS

First Chinese Office Action regarding Application No. 201811582678.X dated Nov. 4, 2019. English translation provided by Unitalen Attorneys at Law.

European Search Report regarding Application No. 19191443.1 dated Jan. 14, 2020.

* cited by examiner

METHOD FOR PHOTOVOLTAIC MODULE FAULT DIAGNOSIS, EDGE CALCULATION PROCESSING DEVICE, AND INVERTER

The present application claims priority to Chinese Patent Application No. 201811582678.X, titled "METHOD FOR PHOTOVOLTAIC MODULE FAULT DIAGNOSIS, EDGE CALCULATION PROCESSING DEVICE, AND INVERTER", filed on Dec. 24, 2018 with the China National Intellectual Property Administration, which is incorporated herein by reference in its entirety.

TECHNICAL FIELD

The present disclosure relates to the technical field of photovoltaic power station fault diagnosis, in particular to a method for photovoltaic module fault diagnosis, an edge calculation processing device, and an inverter.

BACKGROUND

With the development of photovoltaic power generation technology from a high-speed development stage to a mature stage, application scenarios and implementation methods of the photovoltaic power generation technology vary widely, such as a distributed photovoltaic system with complex roof condition and a mountain photovoltaic power station with poor ground flatness, which objectively results in difficulties for module fault diagnosis in photovoltaic power generation system.

In order to solve this problem, in line with the development trend of "intelligent" and "refinement" in the photovoltaic industry, a module-level power electronic (MLPE) device provides a hardware foundation for module-level monitoring and fault diagnosis in photovoltaic power generation system. The module-level power electronic device provides a IV curve of a photovoltaic module by collecting the IV scan data of the photovoltaic module, and the shape of the IV curve can reflect faults and defects of the photovoltaic module.

However, the current solution of analyzing the faults of the photovoltaic module by using the IV curve is highly dependent on a reference device and an environmental monitoring device, that is, it is necessary to use the output of the reference device that has been selected or the data of the environmental monitoring device such as an irradiator. This approach increases a system cost and is subject to regular maintenance of the reference device.

SUMMARY

According to the present disclosure, a method for photovoltaic module fault diagnosis, an edge calculation processing device, and an inverter are provided to solve the problem of the high cost and the requirement of regular maintenance of the reference device caused by high dependence on the reference device and the environmental monitoring device in conventional technology.

The technical solutions according to the present application are described as follows.

In a first aspect of the disclosure, a method for photovoltaic module fault diagnosis is provided. The method includes:

after multiple module-level power electronic devices are controlled to perform IV scanning on photovoltaic modules connected to the multiple module-level power electronic devices respectively and IV curves of the photovoltaic modules are obtained by the multiple module-level power electronic devices respectively, selecting, from the IV curves of the photovoltaic modules, an IV curve satisfying a condition as a reference curve;

comparing each of remaining IV curves in the IV curves of the photovoltaic modules other than the reference curve with the reference curve, to generate comparison results; and generating a fault diagnosis result for each of the photovoltaic modules based on the comparison results.

In an embodiment, the selecting, from the IV curves of the photovoltaic modules, an IV curve satisfying a condition as a reference curve includes:

determining whether the IV curves of the photovoltaic modules include an IV curve satisfying a power output requirement;

performing the operation of selecting, from the IV curves of the photovoltaic modules, an IV curve satisfying a condition as a reference curve after a test condition is changed and the multiple module-level power electronic devices are controlled to perform IV scanning on the photovoltaic modules connected to the multiple module-level power electronic devices respectively and IV curves of the photovoltaic modules are obtained by the multiple module-level power electronic devices respectively, in a case that the IV curves of the photovoltaic modules do not include the IV curve satisfying the power output requirement;

recording the IV curve satisfying the power output requirement as an asterisk curve, in a case that the IV curves of the photovoltaic modules include the IV curve satisfying the power output requirement;

determining whether the asterisk curve satisfies a current stability requirement;

performing the operation of selecting, from the IV curves of the photovoltaic modules, an IV curve satisfying a condition as a reference curve after a test condition is changed and the multiple module-level power electronic devices are controlled to perform IV scanning on the photovoltaic modules connected to the multiple module-level power electronic devices respectively and IV curves of the photovoltaic modules are obtained by the multiple module-level power electronic devices respectively, in a case that the asterisk curve does not satisfy the current stability requirement; and taking the asterisk curve as the reference curve, in a case that the asterisk curve satisfies the current stability requirement.

In an embodiment, the determining whether the IV curves of the photovoltaic modules include an IV curve satisfying a power output requirement includes:

determining whether an IV curve with a greatest fill factor has a greatest maximum output power;

taking the IV curve with the greatest fill factor as the IV curve satisfying the power output requirement, in a case that the IV curve with the greatest fill factor has the greatest maximum output power;

determining whether a maximum output power of the IV curve with the greatest fill factor satisfies a ranking requirement, in a case that the IV curve with the greatest fill factor does not have the greatest maximum output power;

taking the IV curve with the greatest fill factor as the IV curve satisfying the power output requirement, in a case that the maximum output power of the IV curve with the greatest fill factor satisfies the ranking requirement; and determining that the IV curves of the photovoltaic modules do not include the IV curve satisfying the power output requirement, in a case that the maximum output power of the IV curve with the greatest fill factor does not satisfy the ranking requirement.

In an embodiment, the determining whether the asterisk curve satisfies a current stability requirement includes:

determining whether a slope of a first line segment on the asterisk curve is stable and is zero;

determining that the asterisk curve satisfies the current stability requirement, in a case that the slope of the first line segment is stable and is zero;

determining whether a current change of a second line segment on the asterisk curve satisfies a current change requirement, in a case that the slope of the first line segment is stable and is not zero;

determining that the asterisk curve satisfies the current stability requirement, in a case that the current change of the second line segment satisfies the current change requirement; and determining that the asterisk curve does not satisfy the current stability requirement, in a case that the current change of the second line segment does not satisfy the current change requirement or in a case that the slope of the first line segment is not stable.

In an embodiment, the comparing each of remaining IV curves in the IV curves of the photovoltaic modules other than the reference curve with the reference curve, to generate comparison results includes:

for each of the remaining IV curves, dividing each of the reference curve and the remaining IV curve into a left segment and a right segment along a current line on which a maximum power point of the reference curve is located;

generating a first comparison result for the remaining IV curve by performing comparison based on a short circuit current, an open circuit voltage and a slope of a first connection line in the left segment of the reference curve, and a short circuit current, an open circuit voltage, a slope of a first connection line and a slope of a second connection line in the left segment of the remaining IV curve; and generating a second comparison result for the remaining IV curve by performing comparison based on the open circuit voltage and a maximum power point voltage of the reference curve, and the open circuit voltage, a maximum power point voltage and a median iterative current in the right segment of the remaining IV curve.

In an embodiment, the first comparison result for the remaining IV curve includes:

a case that the short circuit current of the remaining IV curve is the same as or is different from the short circuit current of the reference curve;

a case that the open circuit voltage of the remaining IV curve is the same as or is different from the open circuit voltage of the reference curve;

a case that the slope of the first connection line of the remaining IV curve is the same as or is different from the slope of the second connection line of the remaining IV curve; and a case that an absolute value of the slope of the first connection line of the remaining IV curve is greater than or is not greater than an absolute value of the slope of the first connection line of the reference curve; and the second comparison result for the remaining IV curve includes:

a case that the open circuit voltage of the remaining IV curve is less than or is not less than the open circuit voltage of the reference curve;

a case that a difference between the open circuit voltage of the remaining IV curve and the open circuit voltage of the reference curve satisfies or does not satisfy a first preset requirement;

a case that a difference between the maximum power point voltage of the remaining IV curve and the maximum power point voltage of the reference curve satisfies or does not satisfy a second preset requirement;

a case that a first median iterative current in the right segment of the remaining IV curve is less than or is not less than a first median iterative reference current in the right segment of the reference curve;

a case that a second left median iterative current in the right segment of the remaining IV curve is the same as or is different from the first median iterative current;

a case that a second right median iterative current in the right segment of the remaining IV curve is the same as or is different from the first median iterative current;

a case that the second left median iterative current is greater than or is not greater than the first median iterative current;

a case that the second right median iterative current is less than or is not less than the first median iterative current;

a case that slopes of connection lines between any two of points corresponding to the second left median iterative current, the second right median iterative current and the first median iterative current in the remaining IV curve are the same or are different; and a case that a line segment in the remaining IV curve from a point corresponding to the second left median iterative current to a point corresponding to the second right median iterative current has or does not have a convex drop characteristic.

In an embodiment, the generating a fault diagnosis result for each of the photovoltaic modules based on the comparison results includes:

for each of the photovoltaic modules, generating a fault diagnosis result for the photovoltaic module, about back-sheet failure, potential induced degradation, glass fragmentation, dust accumulation and conventional aging, based on the first comparison result for the remaining IV curve of the photovoltaic module; and generating a fault diagnostic result for the photovoltaic module, about solar cell interconnection failure, bypass diode failure, shading loss, severe glass fragmentation, hot spots and data distortion, based on the second comparison result for the remaining IV curve of the photovoltaic module.

In an embodiment, the generating a fault diagnosis result for the photovoltaic module, about back-sheet failure, potential induced degradation, glass fragmentation, dust accumulation and conventional aging, based on the first comparison result for the remaining IV curve of the photovoltaic module includes:

determining a fault diagnosis result for the photovoltaic module as back-sheet failure, if the first comparison result for the remaining IV curve of the photovoltaic module includes a case that the short circuit current of the remaining IV curve is the same as the short circuit current of the reference curve, a case that the open circuit voltage of the remaining IV curve is the same as the open circuit voltage of the reference curve, and a case that the slope of the first connection line of the remaining IV curve is different from the slope of the second connection line of the remaining IV curve;

determining a fault diagnosis result for the photovoltaic module as potential induced degradation, if the first comparison result for the remaining IV curve of the photovoltaic module includes a case that the short circuit current of the remaining IV curve is different from the short circuit current of the reference curve, a case that the open circuit voltage of the remaining IV curve is different from the open circuit voltage of the reference curve, and a case that the slope of the first connection line of the remaining IV curve is different from the slope of the second connection line of the remaining IV curve;

determining a fault diagnosis result for the photovoltaic module as glass fragmentation, if the first comparison result for the remaining IV curve of the photovoltaic module includes a case that the short circuit current of the remaining IV curve is different from the short circuit current of the reference curve, a case that the open circuit voltage of the remaining IV curve is the same as the open circuit voltage of the reference curve, and a case that the slope of the first connection line of the remaining IV curve is different from the slope of the second connection line of the remaining IV curve;

determining a fault diagnosis result for the photovoltaic module as dust accumulation, if the first comparison result for the remaining IV curve of the photovoltaic module includes a case that the short circuit current of the remaining IV curve is different from the short circuit current of the reference curve, a case that the open circuit voltage of the remaining IV curve is the same as the open circuit voltage of the reference curve, a case that the slope of the first connection line of the remaining IV curve is the same as the slope of the second connection line of the remaining IV curve, and a case that the absolute value of the slope of the first connection line of the remaining IV curve is greater than the absolute value of the slope of the first connection line of the reference curve; and determining a fault diagnosis result for the photovoltaic module as conventional aging, if the first comparison result for the remaining IV curve of the photovoltaic module includes a case that the short circuit current of the remaining IV curve is different from the short circuit current of the reference curve, a case that the open circuit voltage of the remaining IV curve is the same as the open circuit voltage of the reference curve, a case that the slope of the first connection line of the remaining IV curve is the same as the slope of the second connection line of the remaining IV curve, and a case that the absolute value of the slope of the first connection line of the remaining IV curve is not greater than the absolute value of the slope of the first connection line of the reference curve.

In an embodiment, the generating a fault diagnostic result for the photovoltaic module, about solar cell interconnection failure, bypass diode failure, shading loss, severe glass fragmentation, hot spots and data distortion, based on the second comparison result for the remaining IV curve of the photovoltaic module includes:

determining a fault diagnosis result for the photovoltaic module as solar cell interconnection failure, if the second comparison result for the remaining IV curve of the photovoltaic module includes a case that the open circuit voltage of the remaining IV curve is less than the open circuit voltage of the reference curve, and a case that the difference between the open circuit voltage of the remaining IV curve and the open circuit voltage of the reference curve does not satisfy the first preset requirement;

determining a fault diagnosis result for the photovoltaic module as bypass diode failure, if the second comparison result for the remaining IV curve of the photovoltaic module includes a case that the open circuit voltage of the remaining IV curve is less than the open circuit voltage of the reference curve, a case that the difference between the open circuit voltage of the remaining IV curve and the open circuit voltage of the reference curve satisfies the first preset requirement, and a case that the difference between the maximum power point voltage of the remaining IV curve and the maximum power point voltage of the reference curve satisfies the second preset requirement;

determining a fault diagnosis result for the photovoltaic module as solar cell interconnection failure, if the second comparison result for the remaining IV curve of the photovoltaic module includes a case that the first median iterative current is not less than the first median iterative reference current, and a case that the difference between the open circuit voltage of the remaining IV curve and the open circuit voltage of the reference curve does not satisfy the first preset requirement;

determining a fault diagnosis result for the photovoltaic module as bypass diode failure, if the second comparison result for the remaining IV curve of the photovoltaic module includes a case that the first median iterative current is not less than the first median iterative reference current, a case that the difference between the open circuit voltage of the remaining IV curve and the open circuit voltage of the reference curve satisfies the first preset requirement, and a case that the difference between the maximum power point voltage of the remaining IV curve and the maximum power point voltage of the reference curve satisfies the second preset requirement;

determining a fault diagnosis result for the photovoltaic module as shading loss, if the second comparison result for the remaining IV curve of the photovoltaic module includes a case that the first median iterative current is less than the first median iterative reference current, and a case that the second left median iterative current is the same as the first median iterative current;

determining a fault diagnosis result for the photovoltaic module as shading loss, if the second comparison result for the remaining IV curve of the photovoltaic module includes a case that the first median iterative current is less than the first median iterative reference current, and a case that the second right median iterative current is the same as the first median iterative current;

determining a fault diagnosis result for the photovoltaic module as severe glass fragmentation, if the second comparison result for the remaining IV curve of the photovoltaic module includes a case that the first median iterative current is less than the first median iterative reference current, and a case that the second left median iterative current is not greater than the first median iterative current;

determining a fault diagnosis result for the photovoltaic module as severe glass fragmentation, if the second comparison result for the remaining IV curve of the photovoltaic module includes a case that the first median iterative current is less than the first median iterative reference current, and a case that the second right median iterative current is not less than the first median iterative current;

determining a fault diagnosis result for the photovoltaic module as hot spots, if the second comparison result for the remaining IV curve of the photovoltaic module includes a case that the first median iterative current is less than the first median iterative reference current, and a case that the slopes of the connection lines between any two of the points corresponding to the second left median iterative current, the second right median iterative current and the first median iterative current in the remaining IV curve are the same;

determining a fault diagnosis result for the photovoltaic module as data distortion, if the second comparison result for the remaining IV curve of the photovoltaic module includes a case that the first median iterative current is less than the first median iterative reference current, and a case that the line segment in the remaining IV curve from the point corresponding to the second left median iterative current to the point corresponding to the second right median iterative current does not have the convex drop characteristic; and determining a fault diagnosis result for the photovoltaic module as severe glass fragmentation, if the second comparison result for the remaining IV curve of the photovoltaic module includes a case that the first median iterative current is less than the first median iterative reference current, and a case that the line segment in the remaining IV curve from the point corresponding to the second left median iterative current to the point corresponding to the second right median iterative current has the convex drop characteristic.

In an embodiment, after generating the fault diagnosis result for each of the photovoltaic modules based on the comparison results, the method further includes:

for each of the remaining IV curves, calculating a minimum power loss of the remaining IV curve based on a maximum output power of the reference curve and a maximum output power of the remaining IV curve, where an inverter or a cloud service platform generates and outputs a module suspend command according to the minimum power loss, and the module suspend command is used to control the module-level power electronic device connected to the photovoltaic module having the remaining IV curve to be disconnected from or isolated from the photovoltaic module connected to the module-level power electronic device.

In another aspect of the disclosure, an edge calculation processing device for performing the above method for photovoltaic module fault diagnosis is provided.

In another aspect of the disclosure, an inverter including a controller is provided, the controller includes the above edge calculation processing device.

According to the method for photovoltaic module fault diagnosis provided by the present disclosure, the following operations are performed. Firstly, multiple module-level power electronic devices are controlled to perform IV scanning on photovoltaic modules connected to the multiple module-level power electronic devices respectively and IV curves of the photovoltaic modules are obtained by the multiple module-level power electronic devices respectively. Secondly, an IV curve satisfying a condition is selected from the IV curves of the photovoltaic modules as a reference curve. Thirdly, each of remaining IV curves in the IV curves of the photovoltaic modules other than the reference curve is compared with the reference curve, to generate comparison results. Finally, a fault diagnosis result for each of the photovoltaic modules is generated based on the comparison results. Therefore, the photovoltaic module fault diagnosis in the disclosure does not need to depend on the output of the reference device and the data of the environmental monitoring device such as an irradiator in the conventional technology, thereby avoiding the problem of the high cost and regular maintenance of the reference device.

BRIEF DESCRIPTION OF THE DRAWINGS

In order to more clearly illustrate the technical solutions in the embodiments of the present disclosure or in conventional technology, the drawings used in the embodiments or the description of the conventional technology are briefly described below. Apparently, the drawings in the following description show only some embodiments of the present disclosure, and those skilled in the art can obtain other drawings according to the drawings without any creative work.

DETAILED DESCRIPTION OF THE EMBODIMENTS

The technical solutions in the embodiments of the present disclosure are clearly and completely described in the following with reference to the accompanying drawings in the embodiments of the present application. Apparently, the embodiments described here are only a part rather than all of the embodiments of the present application. Based on the embodiments of the present application, all other embodiments obtained by those skilled in the art without creative efforts fall into the scope of the present disclosure.

According to the present disclosure, a method for photovoltaic module fault diagnosis is provided to solve the problem of the high cost and the requirement of regular maintenance of the reference device caused by high dependence on the reference device and the environmental monitoring device in conventional technology.

Figure 1:
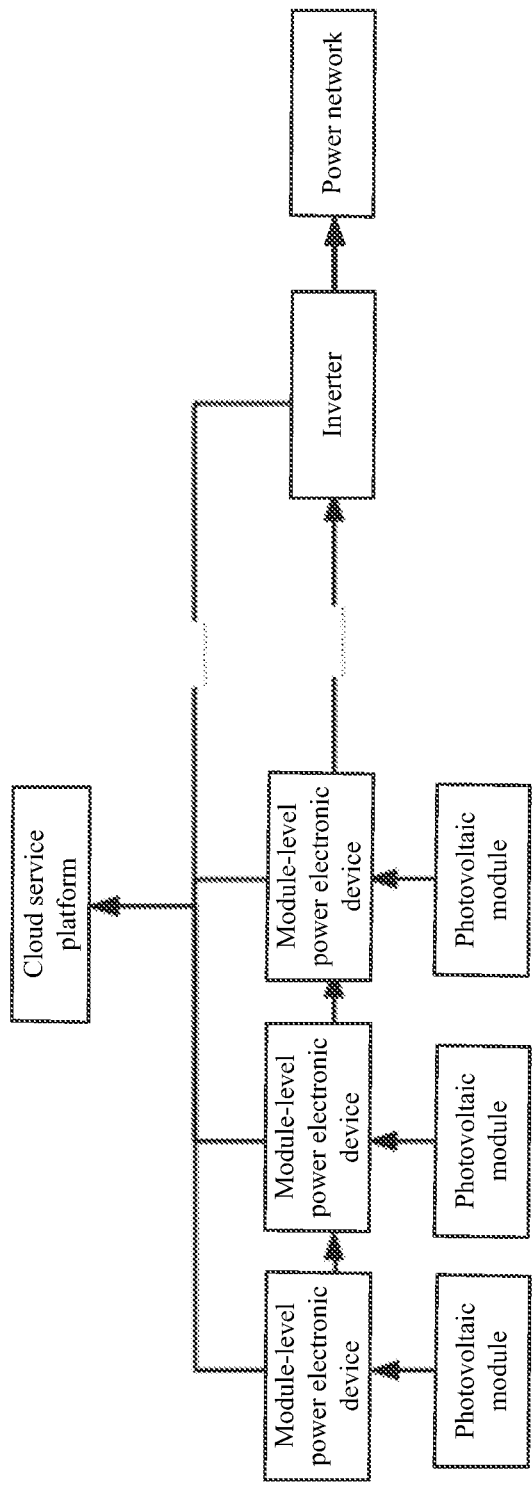
FIG. 1 is a schematic structural diagram of a photovoltaic power generation system according to an embodiment of the present disclosure.

The photovoltaic power generation system applied in the method for photovoltaic module fault diagnosis is as shown in FIG. 1. The photovoltaic power generation system includes multiple module-level power electronic devices with a function of IV scanning and an inverter. The inverter converts a direct current to an alternating current and feeding the alternating current to the power grid, one end of the inverter transmits the uplink data to the cloud service platform monitoring the whole network through a communication line, and the other end of the inverter is connected with a communication port of the photovoltaic modules and the module-level power electronic devices. In addition, the inverter can also perform local mathematical model training through a built-in edge computing chip to realize the following method for photovoltaic module fault diagnosis.

Figure 2:
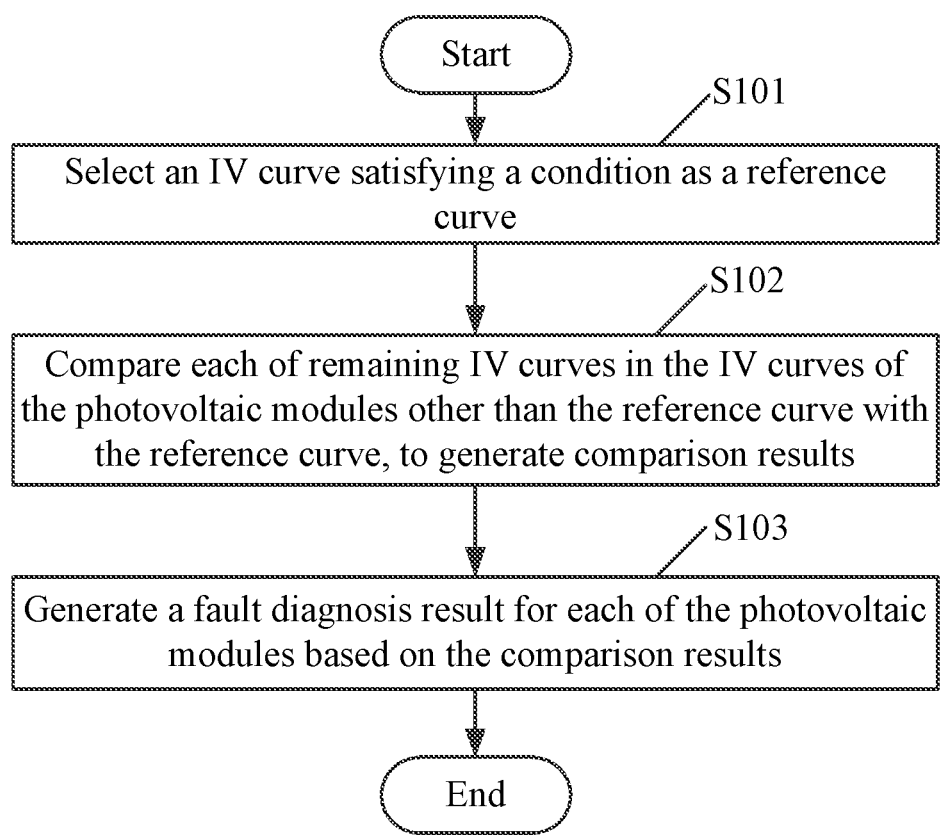
FIG. 2 is a schematic flow chart of a method for photovoltaic module fault diagnosis according to an embodiment of the present disclosure.

Referring to FIG. 2, the method for photovoltaic module fault diagnosis includes steps S101 to S103.

Step S101 is performed after multiple module-level power electronic devices are controlled to perform IV scanning on photovoltaic modules connected to the multiple module-level power electronic devices respectively and IV curves of the photovoltaic modules are obtained by the multiple module-level power electronic devices respectively.

In practice, after an operation and maintenance cleaning cycle is completed and the irradiance conditions are good, the inverter sends an IV scan command to the module-level power electronic devices to control the module-level power electronic devices of the whole stations or the module-level power electronic devices of the whole string to perform IV scan on the PV modules connected to the module-level power electronic devices at the same time. The scan results can be processed by an edge computing chip built in the inverter, or uploaded to the cloud service platform for analysis, depending on the specific application environment, all of which are within the scope of this application.

The scan results include the IV scan data of all scanned photovoltaic modules, and the maximum power point voltage $V_{mpp}$ the maximum power point current $I_{mpp}$, the open circuit voltage $V_{OC}$ and the short circuit current $I_{SC}$ in the data are recorded, and an IV curve of each photovoltaic module is drawn based on these data.

In step S101, an IV curve satisfying a condition is selected from the IV curves of the photovoltaic modules as a reference curve.

In this embodiment, in order to reduce the reference device and the environmental monitoring device in the conventional technology, an IV curve with the best output performance is selected from the IV curves of all the scanned photovoltaic modules as the reference curve. How to select the IV curve with the best output performance depends on a restriction condition. For example, the restriction condition includes that a fill factor and a maximum output power are both optimal, that is, both the fill factor and the maximum output power can rank first in order of ranking from the greatest to the least in all scanned photovoltaic modules. Alternatively, the restriction condition includes that the fill factor and the maximum output power are optimally integrated, that is, the fill factor and the maximum output power are not ranked first at the same time but are optimal in comprehensive tradeoff. Moreover, when the voltage is small, for example, before reaching half of the open circuit voltage, the corresponding current is constant. In practice, the restriction condition may be set according to the specific application environment, which are not limited herein, and is within the protection scope of the present application.

In S102, each of remaining IV curves in the IV curves of the photovoltaic modules other than the reference curve is compared with the reference curve, to generate comparison results.

For the sake of distinction, the reference curve is recorded as the 0th curve, and the data of the 0th curve is added with 0 as the mark on the upper right, such as $V_{mpp}^{(0)}$, $I_{mpp}^{(0)}$, $V_{OC}^{(0)}$, $I_{SC}^{(0)}$. Any IV curve other than the reference curve is recorded as the i-th curve, and the data of the i-th curve is added with i as the mark on the upper right, such as $V_{mpp}^{(i)}$, $V_{mpp}^{(i)}$, $V_{OC}^{(i)}$, $I_{SC}^{(i)}$. Then, the i-th curve is compared with the reference curve. In practice, the specific comparison scheme may adopt any suitable scheme existing in the conventional technology, and the IV curve of the reference module in conventional technology is replaced by the reference curve, which is not specifically limited herein and depends on the specific application environment, and is also within the protection scope of the present application.

In step S103, a fault diagnosis result for each of the photovoltaic modules is generated based on the comparison results.

The fault diagnosis result includes back-sheet failure, potential induced degradation, dust accumulation, conventional aging, solar cell interconnection failure, bypass diode failure, shading loss, hot spots, data distortion, glass fragmentation, and severe glass fragmentation or the like. Based on different comparison results, different fault diagnosis results may be obtained, and the specific corresponding manners may be determined according to the specific application environment, and are all within the protection scope of the present application.

With the method for photovoltaic module fault diagnosis according to the present embodiment, the fault diagnosis result for each photovoltaic module may be generated by the above process. In the above process, the output of the reference device in the conventional technology is replaced by the reference curve satisfying the condition. The dependence on the output of the reference device in the conventional technology is eliminated, and the data of the environmental monitoring device such as an irradiator is not needed, thereby avoiding the problem of the high cost and the requirement of regular maintenance of the reference device. The method can be widely applied to distributed photovoltaic systems, especially the currently increasing household photovoltaic system.

It should be noted that, in the conventional technology, when studying the IV curves of photovoltaic modules, the mathematical model of the photovoltaic module is usually established and extracted by analyzing the output parameters of the photovoltaic module, and the model is used for calibration and reproduction of the IV output of photovoltaic module under non-standard test conditions in the field of system applications. The establishment of the mathematical model of the photovoltaic module is based on the input of the data of the reference device, and the accuracy of the established mathematical model itself has a great impact on the selection of the reference data. With the method for photovoltaic module fault diagnosis according to the present embodiment, the photovoltaic module fault can be analyzed and processed in the photovoltaic system without any specific reference device, without any environmental monitoring device (irradiator or temperature sensor), and without a mathematical model for reference, thereby avoiding the dependence of reference device and environmental monitoring device in the conventional technology, and avoiding the influence of the accuracy of the mathematical model.

In addition, the research object in the conventional technology has a large granularity, and the selected reference photovoltaic string contains multiple photovoltaic modules, which cannot achieve module level management, and is difficult to achieve refinement. With the method for photovoltaic module fault diagnosis according to the present embodiment, the reference curve is derived from a common photovoltaic module, and the research object is reduced to the level of module, which reduces the granularity of the research object and achieves refinement.

It is also should be noted that most of the methods and logics in the conventional technology need to be uploaded to the cloud service platform, and then the cloud service platform issues instructions, and the operation and maintenance personnel process on site. The above operations has high requirements for network data transmission, and the waiting time for the cloud service platform to response is long, which is not conducive to the rapid elimination of faults, and is difficult to meet the requirement of "unattended and less attended". With the method for photovoltaic module fault diagnosis according to the present embodiment, local fault analysis and processing can be implemented by an inverter, thereby reducing the response time due to full decision-making by the cloud service platform, and improving the response speed.

Figure 3:
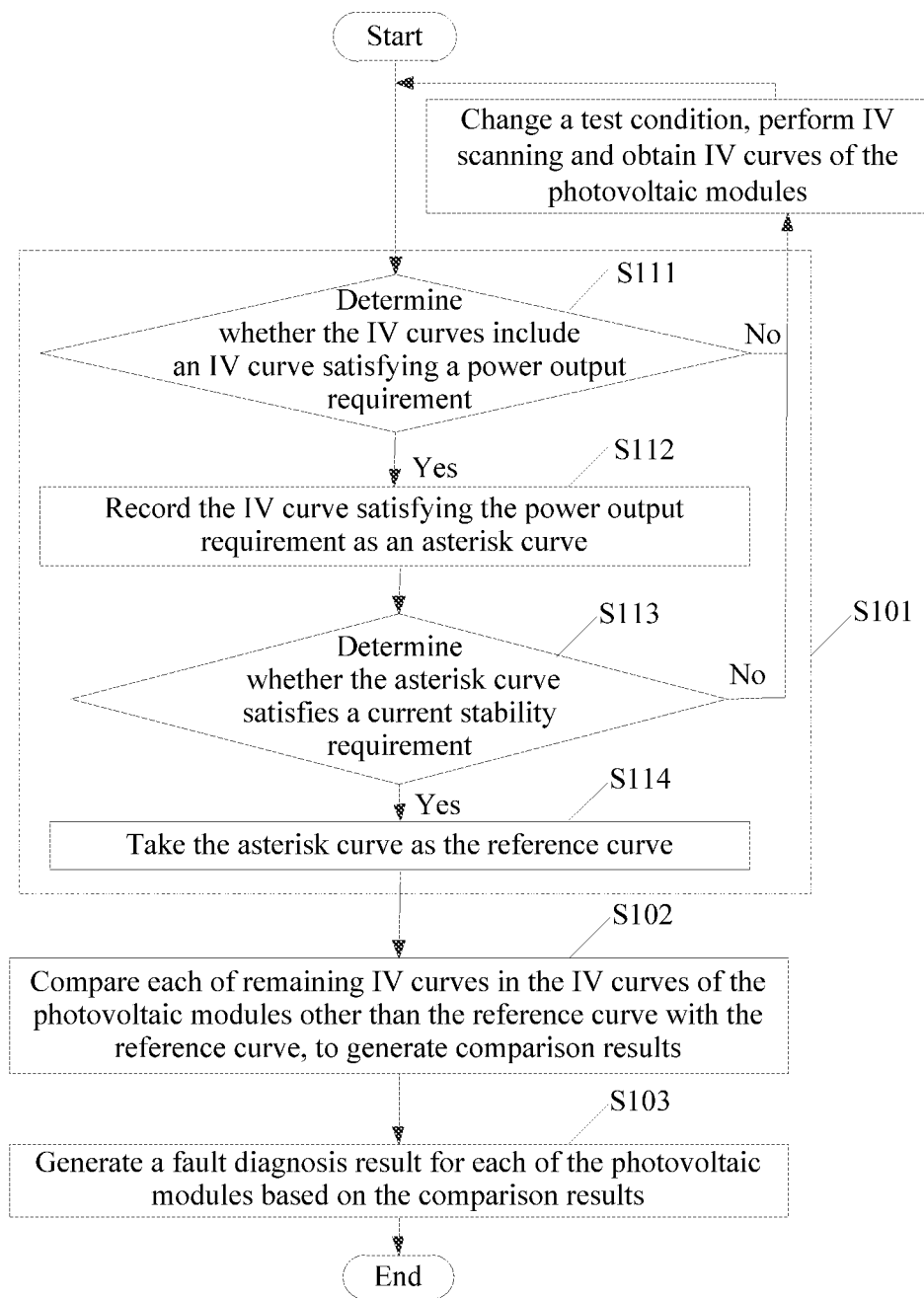
FIG. 3 is a schematic flow chart of a method for photovoltaic module fault diagnosis according to an embodiment of the present disclosure.

A method for photovoltaic module fault diagnosis is provided according to another embodiment of the present application. Based on the above embodiments shown in FIG. 1 and FIG. 2, the step S101 of selecting, from the IV curves of the photovoltaic modules, an IV curve satisfying a condition as a reference curve includes following steps S111 to S114 shown in FIG. 3.

In S111, it is determined whether the IV curves of the photovoltaic modules include an IV curve satisfying a power output requirement.

In this process, a fill factor FF of each IV curve is calculated based on the maximum power point voltage $V_{mpp}$, the maximum power point current $I_{mpp}$, the open circuit voltage $V_{OC}$ and the short circuit current $I_{SC}$ of each IV curve, and the equation $$FF = \frac{V_{mpp} \times I_{mpp}}{V_{OC} \times I_{SC}} \times 100\%.$$

The maximum output power $P_{mpp}$ of each IV curve is calculated according to the equation $P_{mpp}=V_{mpp} \times I_{mpp}$.

It is determined, based on the above calculation result, whether an IV curve with a greatest fill factor has a greatest maximum output power. That is, it is determined whether there is an IV curve has the greatest fill factor and the greatest maximum output power.

In a case that the IV curve with the greatest fill factor has the greatest maximum output power, the IV curve with the greatest fill factor is taken as the IV curve satisfying the power output requirement. In a case that the IV curve with the greatest fill factor does not have the greatest maximum output power, it is determined whether a maximum output power of the IV curve with the greatest fill factor satisfies a ranking requirement. For example, the ranking requirement is that the maximum output power falls within the first 5% of the maximum output power ranking of the sample population (that is, all IV curves). Apparently, other ranges of ranking requirements may also be set in practice, and this is just an example, depending on the specific application environment, and other ranges are within the scope of the present application.

In a case that the maximum output power of the IV curve with the greatest fill factor satisfies the ranking requirement, the IV curve with the greatest fill factor is taken as the IV curve satisfying the power output requirement and step S112 is performed. In a case that the maximum output power of the IV curve with the greatest fill factor does not satisfy the ranking requirement, it is determined that the IV curves of the photovoltaic modules do not include the IV curve satisfying the power output requirement. Step S111 is performed after a test condition is changed and the multiple module-level power electronic devices are controlled to perform IV scanning on the photovoltaic modules connected to the multiple module-level power electronic devices respectively and IV curves of the photovoltaic modules are obtained by the multiple module-level power electronic devices respectively.

In step S112, the IV curve satisfying the power output requirement is recorded as an asterisk curve.

For the sake of distinction, the data of the asterisk curve may be added with a * as the mark on the upper right, such as $V_{mpp}^{(*)}$, $I_{mpp}^{(*)}$, $V_{OC}^{(*)}$, $I_{SC}^{(*)}$.

In step S113, it is determined whether the asterisk curve satisfies a current stability requirement.

Figure 4:
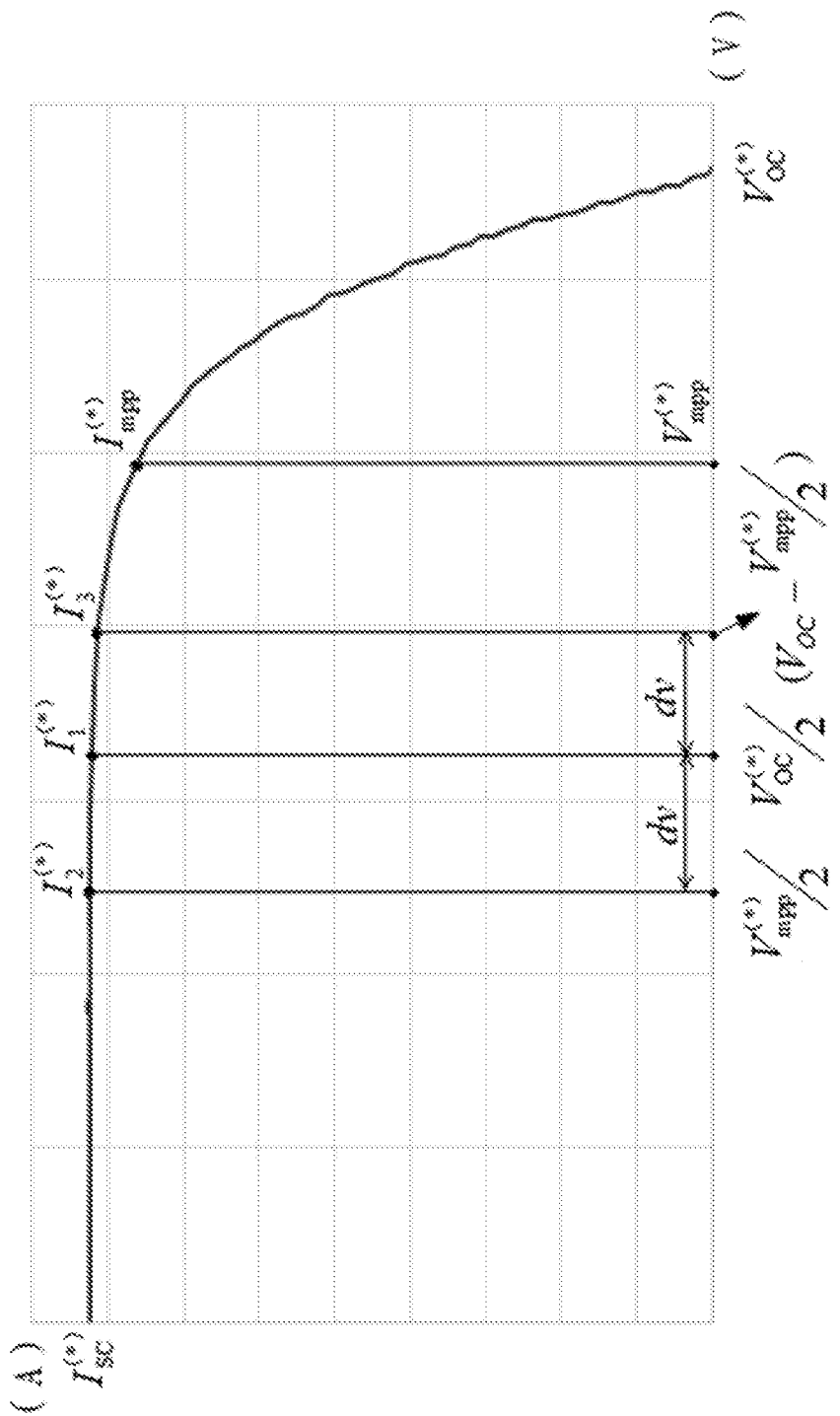
FIG. 4 is a schematic diagram of segmentation of an asterisk curve according to an embodiment of the present disclosure.

In this process, first, the asterisk curve is segmented. As shown in FIG. 4, the current corresponding to the voltage $V_{OC}^{(*)}/2$ is recorded as $I_1^{(*)}$. The current corresponding to the voltage $V_{mpp}^{(*)}/2$ is recorded as $I_2^{(*)}$. The voltage difference between $V_{OC}^{(*)}/2$ and $V_{mpp}^{(*)}/2$ is recorded as dv. The current corresponding to the voltage $(V_{OC}-V_{mpp}^{(*)}/2)$, which is on the right side of $V_{OC}^{(*)}/2$ and has a distance of dv from $V_{OC}^{(*)}/2$, is $I_3^{(*)}$.

Then, the slopes are selected for the asterisk curve. Specifically, the curve segment corresponding to the voltage range from 0 to $V_{OC}^{(*)}/2$ on the asterisk curve is taken as a first line segment, and a slope of the connection line between the two ends of the first line segment is recorded as $k_1^{(*)}$. The slope of the connection line between two points, corresponding to the voltages of 0 and $V_{mpp}^{(*)}/2$ in the asterisk curve, is recorded as $k_2^{(*)}$. The curve segment corresponding to the voltage range from $V_{mpp}^{(*)}/2$ to $(V_{OC}-V_{mpp}^{(*)}/2)$ on the asterisk curve is taken as a second line segment.

In the process of determining whether the current stability requirement is satisfied, first, it is determined whether a slope of the first line segment on the asterisk curve is stable and is zero, for example, it is determined whether the equation $k_1^{(*)}=k_2^{(*)}=0$ is satisfied. In practice, it is also possible to select a connection line between other points to determine whether the slope is stable. Here is only an example, as long as it can be determined that the slope of the first line segment is stable to zero, other examples are within the protection scope of the present application.

If the slope of the first line segment is stable and is zero, that is, if the equation $k_1^{(*)}=k_2^{(*)}=0$ is satisfied, then the asterisk curve is determined to satisfy the current stability requirement.

If the slope of the first line segment is stable (that is, $k_1^{(*)}=k_2^{(*)}$) and is not zero, then it is determined whether a current change of the second line segment on the asterisk curve satisfies a current change requirement. The current change may be characterized by $$\frac{I_2^{(*)} - I_3^{(*)}}{I_2^{(*)} - I_1^{(*)}},$$

correspondingly, the current change requirement may be expressed as $$\frac{I_2^{(*)} - I_3^{(*)}}{I_2^{(*)} - I_1^{(*)}} \approx 2.$$

Apparently, the current change may also be characterized by the change of the current corresponding to other points, and other ratios may be set as the current change requirement. This is only an example, not limited to this, depending on the specific application environment, other examples are within the scope of protection of this application.

It is determined that the asterisk curve satisfies the current stability requirement and step S114 is performed, in a case that the current change of the second line segment satisfies the current change requirement. It is determined that the asterisk curve does not satisfy the current stability requirement, in a case that the current change of the second line segment does not satisfy the current change requirement or in a case that the slope of the first line segment is not stable (that is, $k_1^{(*)} \neq k_2^{(*)}$). Step S111 is performed after a test condition is changed and the multiple module-level power electronic devices are controlled to perform IV scanning on the photovoltaic modules connected to the multiple module-level power electronic devices respectively and IV curves of the photovoltaic modules are obtained by the multiple module-level power electronic devices respectively.

In the above process of determining whether the current stability requirement is satisfied, the specific division of the first line segment and the second line segment is only an example. In practice, other points may also be used as the end points of the line segments, as long as the stability of the current at a low voltage can be reflected, depending on the specific application environment, which is within the protection scope of the present application.

In S114, the asterisk curve is taken as the reference curve.

In this embodiment, a specific implementation manner of reference curve selection is given. In practice, an appropriate adjustment may be made according to a specific application environment, as long as the IV curve closest to the ideal state can be selected from all IV curves, all the implementation manners are within the protection scope of this application.

Other principles are the same as those in the above embodiment, and are not described here.

Figure 5:
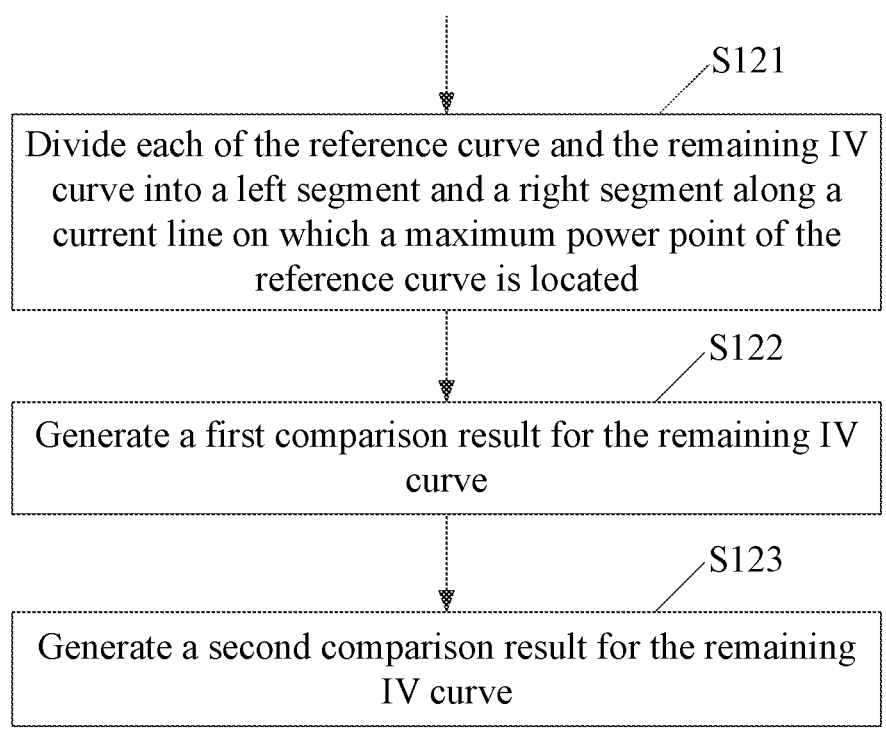
FIG. 5 is a schematic flow chart of a part of steps of a method for photovoltaic module fault diagnosis according to an embodiment of the present disclosure.

A method for photovoltaic module fault diagnosis is further provided according to another embodiment of the present application. Based on the above embodiments and FIG. 1 to FIG. 4, the step S102 of comparing each of remaining IV curves in the IV curves of the photovoltaic modules other than the reference curve with the reference curve, to generate comparison results includes following steps S121 to S123, as shown in FIG. 5.

In step S121, for each of the remaining IV curves, each of the reference curve and the remaining IV curve is divided into a left segment and a right segment along a current line on which a maximum power point of the reference curve is located.

For the sake of distinction, the reference curve may be recorded as the 0th curve, and the data of the 0th curve is added with 0 as the mark on the upper right, such as $V_{mpp}^{(0)}$, $I_{mpp}^{(0)}$, $V_{OC}^{(0)}$, $I_{SC}^{(0)}$, and any IV curve other than the reference curve is recorded as the i-th curve, and the data of the i-th curve is added with i as the mark on the upper right, such as $V_{mpp}^{(i)}$, $I_{mpp}^{(i)}$, $V_{OC}^{(i)}$, $I_{SC}^{(i)}$. Then, the i-th curve and the reference curve are superposed and compared. Then, the overlapped IV curve cluster is divided based on the 0th curve. Each of the 0th curve and the i-th curve is divided into a left segment and a right segment by taking the current line, perpendicular to the voltage axis and with a voltage of $V_{mpp}^{(0)}$ on the 0th IV) curve, as a demarcation line. The segment corresponding to the voltage range from 0 to $V_{mpp}^{(0)}$ is the left segment, and the segment corresponding to the voltage range from $V_{mpp}^{(0)}$ to $V_{OC}^{(0)}$ is the right segment. The current of the 0th curve at the voltage of $V_{OC}^{(0)}/2$ is $I_1^{(0)}$, and the slope of the connection line connecting the points corresponding to $I_1^{(0)}$ and $I_{SC}^{(0)}$ is $k_1^{(0)}$. The current of the i-th curve at the voltage of $V_{OC}^{(0)}/2$ is $I_1^{(i)}$, and the slope of the connection line connecting the points corresponding to $I_1^{(i)}$ and $I_{SC}^{(i)}$ is $k_1^{(i)}$.

In step S122, a first comparison result for the remaining IV curve is generated by performing comparison based on a short circuit current, an open circuit voltage and a slope of a first connection line in the left segment of the reference curve, and a short circuit current, an open circuit voltage, a slope of a first connection line and a slope of a second connection line in the left segment of the remaining IV curve.

This process is mainly to achieve the test and analysis of the left segment. Specifically, first, a current line perpendicular to the voltage axis and with a voltage of $V_{mpp}^{(0)}/2$ on the 0th IV curve is selected, and the current of the 0th curve at the voltage of $V_{mpp}^{(0)}/2$ is $I_2^{(0)}$, and the slope of the connection line connecting the points corresponding to $I_2^{(0)}$ and $I_{SC}^{(0)}$ is $k_2^{(0)}$. The current of the i-th curve at the voltage of $V_{mpp}^{(0)}/2$ is $I_2^{(i)}$, and the slope of the connection line connecting the points corresponding to $I_2^{(i)}$ and $I_{SC}^{(i)}$ is $k_2^{(i)}$.

By comparing parameters, a feature value indicating whether the photovoltaic module fails may be extracted, thereby generating a first comparison result for the photovoltaic module. By determining the logical combination of the feature values in the first comparison result, it can be further determined whether a fault diagnosis result of the photovoltaic module is back-sheet failure, potential induced degradation (PID), glass fragmentation, dust accumulation and conventional aging.

Figure 6A:
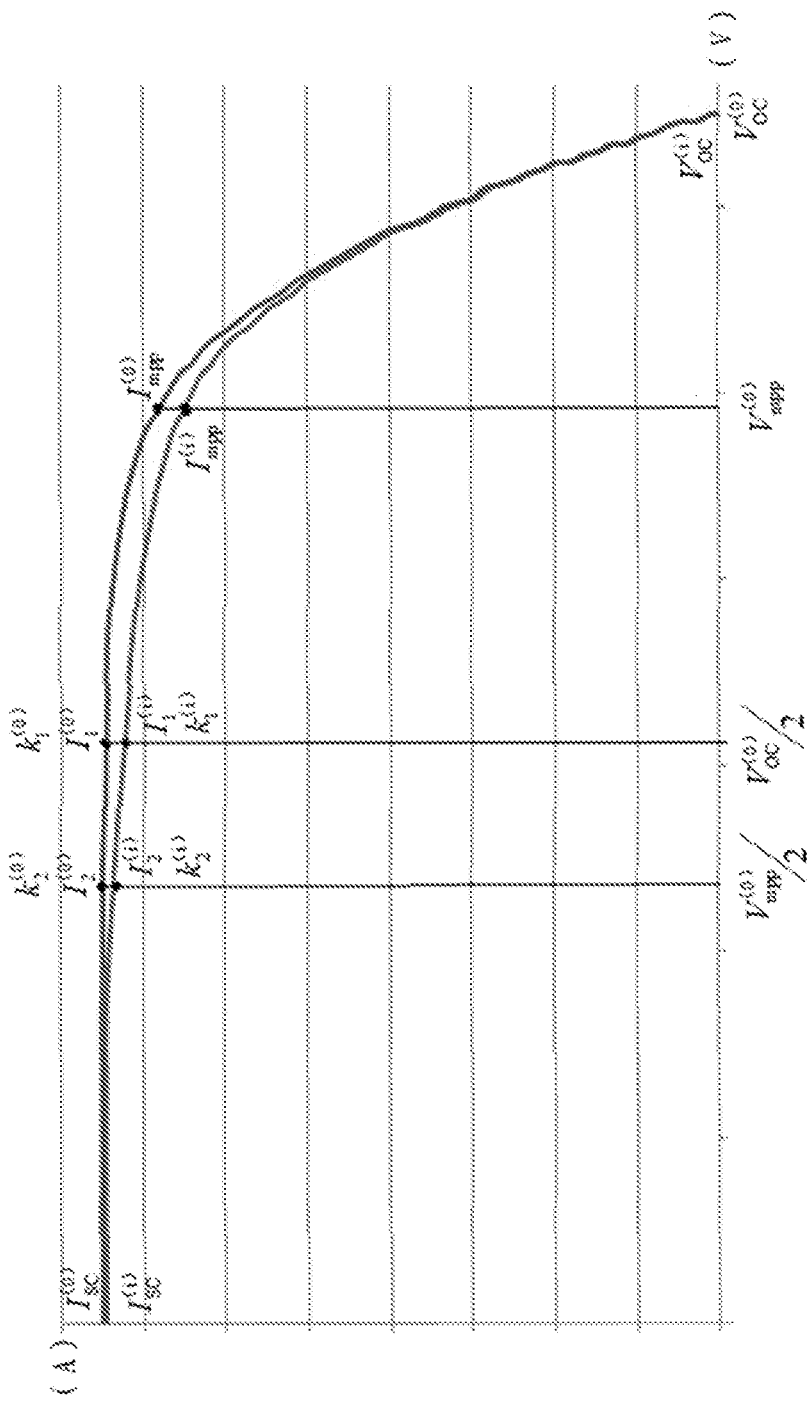
FIG. 6a is a schematic diagram of the test and analysis of the left segment of the curve according to an embodiment of the present disclosure.
Figure 6B:
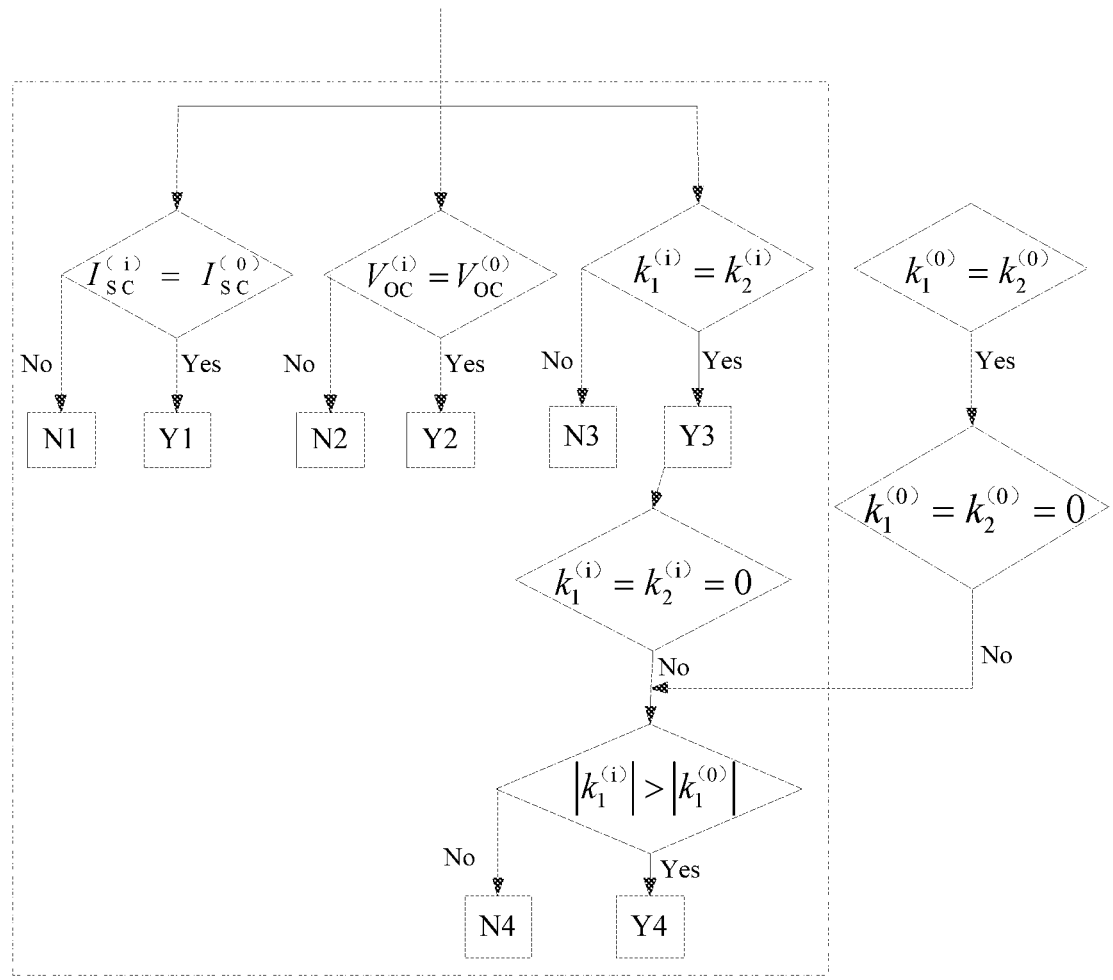
FIG. 6b is a schematic flow chart of the first part of a logic for performing photovoltaic module fault diagnosis for the test and analysis of the left segment according to an embodiment of the present disclosure.

FIG. 6a is a schematic diagram of the test and analysis of the left segment of the curve according to an embodiment of the present disclosure. The dotted line box in FIG. 6b shows the first part of a logic for performing photovoltaic module fault diagnosis for the test and analysis of the left segment according to an embodiment of the present disclosure. Taking the manner for dividing the left segment and right segment in the above embodiment as an example, when performing test and analysis on the left segment of the curve, the specific operation is as follows. According to whether the equation $I_{SC}^{(i)}=I_{SC}^{(0)}$ is satisfied, a feature value Y1 is obtained in a case that the short circuit current of the remaining IV curve is the same as the short circuit current of the reference curve, or a feature value N1 is obtained in a case that the short circuit current of the remaining IV curve is different from the short circuit current of the reference curve. According to whether the equation $V_{OC}^{(i)}=V_{OC}^{(0)}$ is satisfied, a feature value Y2 is obtained in a case that the open circuit voltage of the remaining IV curve is the same as the open circuit voltage of the reference curve, or a feature value N2 is obtained in a case that the open circuit voltage of the remaining IV curve is different from the open circuit voltage of the reference curve. According to whether the equation $k_1^{(i)}=k_2^{(i)}$ is satisfied, a feature value Y3 is obtained in a case that the slope of the first connection line of the remaining IV curve is the same as the slope of the second connection line of the remaining IV curve, or a feature value N3 is obtained in a case that the slope of the first connection line of the remaining IV curve is different from the slope of the second connection line of the remaining IV curve. According to whether the inequality $|k_1^{(i)}|>|k_1^{(0)}|$ is satisfied, a feature value Y4 is obtained in a case that an absolute value of the slope of the first connection line of the remaining IV curve is greater than an absolute value of the slope of the first connection line of the reference curve, or a feature value N4 is obtained in a case that an absolute value of the slope of the first connection line of the remaining IV curve is not greater than an absolute value of the slope of the first connection line of the reference curve. The fault diagnosis result can be obtained based on the logical combination of these feature values.

In step S123, a second comparison result for the remaining IV curve is generated by performing comparison based on the open circuit voltage and a maximum power point voltage of the reference curve, and the open circuit voltage, a maximum power point voltage and a median iterative current in the right segment of the remaining IV curve.

This process is mainly to achieve the test and analysis of the right segment, and determine the solar cell interconnection failure, bypass diode failure, shading loss, severe glass fragmentation and hot spots in the failure type of the photovoltaic module. Specifically, first, a current line perpendicular to the voltage axis and with a voltage of $V_{mpp}^{(i)}$ or $(V_{mpp}^{(0)})$ on the i-th IV curve (or the 0th IV curve) is selected in a case that the 0th curve and the i-th curve overlap in the right segment, and the current of the i-th IV curve (or the 0th IV curve) at the $V_{mpp}^{(i)}$ is $I_{mpp}^{(i)}$ (or $I_{mpp}^{(0)}$).

When performing the test and analysis of the right segment, the difficulty lies in the selection of the current used in the fault diagnosis. The best case is that the current is taken from the middle section of the IV curve distortion, and the current for discrimination should be avoided to fall into the steep distortion section of the IV curve. Due to the rapid development of photovoltaic module technology, different technology and the different internal connections of photovoltaic modules result in a large difference in the open circuit voltages of photovoltaic modules. If the current corresponding to a specific voltage is selected by experience, it is likely to result in limitations of the solution. In addition, improper selection of current may cause the analysis of the shape of the IV curve to reflect only local data changes, ignoring the overall data trend.

Therefore, in order to solve the above problem and increase the versatility of the solution, a median iterative algorithm based on voltage axis (the segment from to $V_{mpp}^{(i)}$ to $V_{OC}^{(i)}$, or from $V_{mpp}^{(0)}$ to $V_{OC}^{(0)}$) in the right segment is introduced according to the present embodiment, to select the distortion section of the IV curve as soon as possible. The multi-step phenomenon of individual IV data can be avoided by changing the research object of the median iterative algorithm (the i-th curve or the 0th curve).

The right segment fault determination process of the median iterative algorithm is specifically described as follows. For the IV curve of any photovoltaic module, the voltage section studied is the section from $V_{mpp}$ to $V_{OC}$. Specifically, starting at the midpoint of the segment from $V_{mpp}$ to $V_{OC}$, a midpoint is taken from left to right in the direction towards $V_{OC}$ (the number of iterations is marked as m, and the subscript is marked as rr), and another midpoint is taken from right to left in the direction towards $V_{mpp}$ (the number of iterations is marked as m, and the subscript is marked as rl). When m=n=1, that is, the voltage is the midpoint $V_{mn}$ between $V_{mpp}$ and $V_{OC}$ after the first median iteration, and $V_{mn}$ can be calculated by the following representation:

$$V_{mn} = \frac{V_{mpp} + V_{OC}}{2}.$$

When the n-th median iteration is performed in the direction towards $V_{mpp}$ (left), $V_{rln}$ is obtained, and the corresponding current is $I_{rln}$, and $V_{rln}$ can be calculated by the following representation:

$$V_{rln} = \frac{(2^n - 1)V_{mpp} + V_{OC}}{2^n}.$$

When the m-th median iteration is performed in the direction towards $V_{OC}$ (right), $V_{rrm}$ is obtained, and the corresponding current is $I_{rrm}$, and $V_{rrm}$ can be calculated by the following representation:

$$V_{rrm} = \frac{V_{mpp} + (2^n - 1)V_{OC}}{2^m}.$$

By controlling the values of m and n, the distortion region to be intercepted from the step segment on the IV curve is located, and the corresponding $I_{rln}$ and $I_{rrm}$ are determined, then the currents ($I_{rln}^{(i)}$, $I_{rrm}^{(i)}$, $I_{mn}^{(i)}$) of the i-th curve are compared with the currents ($I_{rln}^{(0)}$, $I_{rrm}^{(0)}$, $I_{mn}^{(0)}$) of the 0th curve respectively, for example, $I_{rln}^{(i)}$ is less than $I_{rln}^{(0)}$, $I_{rrm}^{(i)}$ is less than $I_{rrm}^{(0)}$, $I_{mn}^{(i)}$ is less than $I_{mn}^{(0)}$. Take two iterations as an example. For the 0th curve, a first median iterative reference current is $I_{mn}^{(0)}$, a second left Ire median iterative reference current is $I_{rl2}^{(0)}$, and a second right median iterative reference current is $I_{rr2}^{(0)}$. For the i-th curve, a first median iterative current is $I_{mn}^{(i)}$, a second left median iterative current is $I_{rl2}^{(i)}$, and a second right median iterative current is $I_{rr2}^{(i)}$). By calculation, $k_{2mn}^{(i)}$ can be obtained, which is the slope of the connection line between the points corresponding to $I_{rl2}^{(i)}$ and $I_{mn}^{(i)}$, $k_{mn2}^{(i)}$ can be obtained, which is the slope of the connection line between points corresponding to $I_{rr2}^{(i)}$ and $I_{mn}^{(i)}$, and $k_{22}^{(i)}$ can be obtained, which is the slope of the connection line between the points corresponding to $I_{rl2}^{(i)}$ and $I_{rr2}^{(i)}$.

Figure 7A:
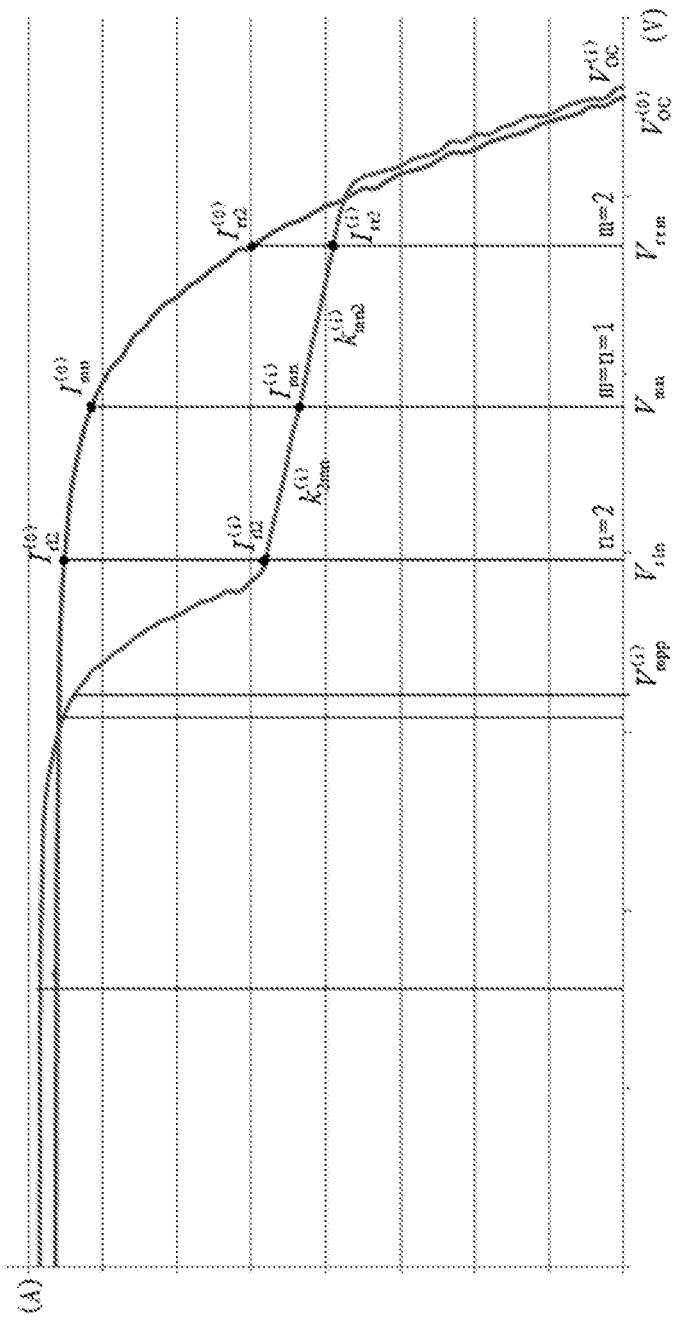
FIG. 7a is a schematic diagram of the test and analysis of the right segment of the curve by using a median iterative algorithm according to an embodiment of the present disclosure.
Figure 7B:
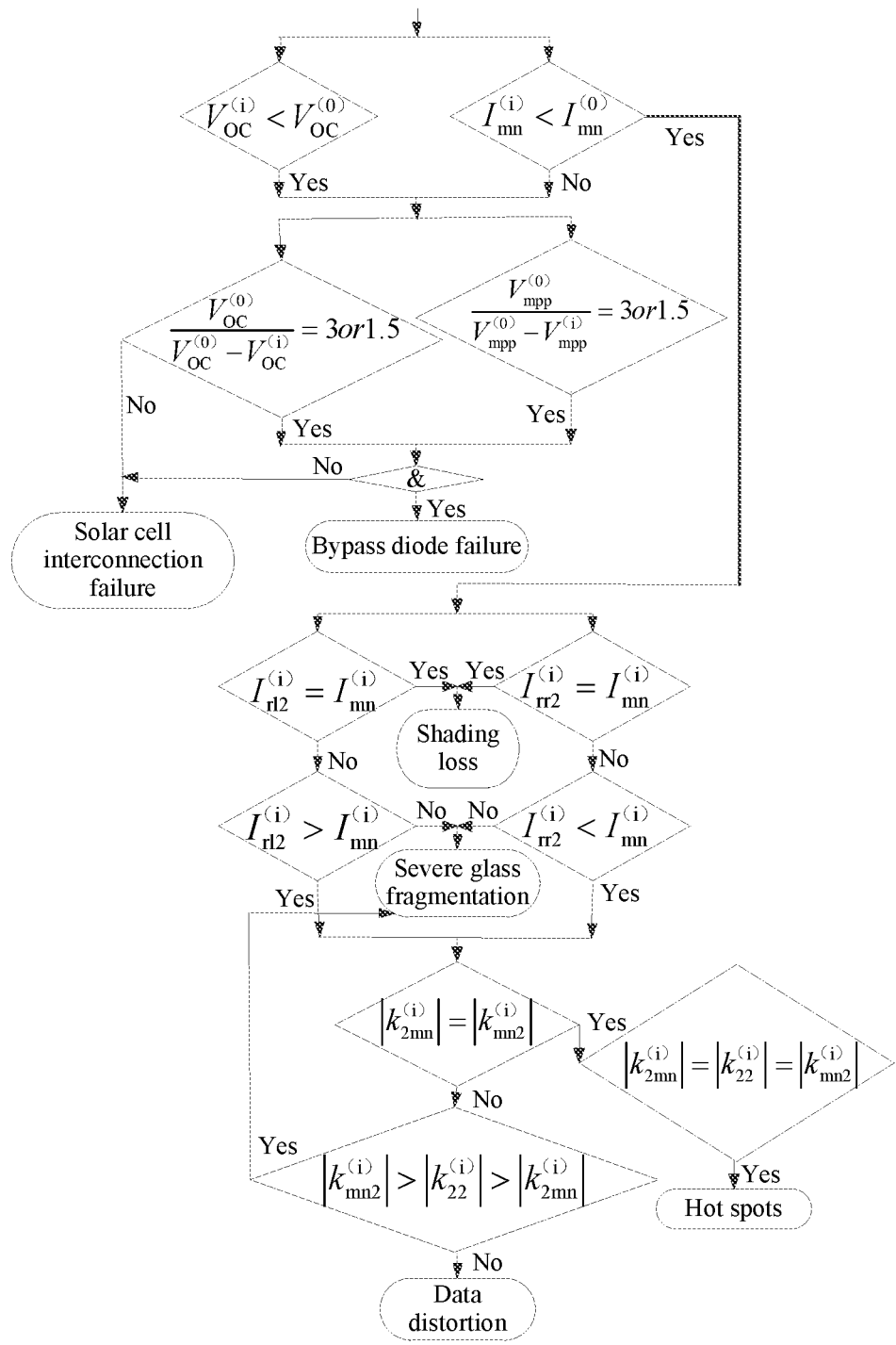
FIG. 7b is schematic flow chart of a logic for performing photovoltaic module fault diagnosis for the test and analysis of the right segment according to an embodiment of the present disclosure.

FIG. 7a is a schematic diagram of the test and analysis of the right segment of the curve by using a median iterative algorithm according to an embodiment of the present disclosure. FIG. 7b is schematic flow chart of a logic for performing photovoltaic module fault diagnosis for the test and analysis of the right segment according to an embodiment of the present disclosure. Taking the manner for dividing the left segment and right segment in the above embodiment as an example, when performing test and analysis on the left segment of the curve, the specific operation is as follows. A feature value, indicating whether the open circuit voltage of the remaining IV curve is less than or is not less than the open circuit voltage of the reference curve, is obtained according to whether the inequality $V_{OC}^{(i)} < V_{OC}^{(0)}$ is satisfied. A feature value, indicating whether a difference between the open circuit voltage of the remaining IV curve and the open circuit voltage of the reference curve satisfies or does not satisfy a first preset requirement, is obtained according to whether the equation $$\frac{V_{OC}^{(0)}}{V_{OC}^{(0)} - V_{OC}^{(i)}} = 3$$

or the equation $$\frac{V_{OC}^{(0)}}{V_{OC}^{(0)} - V_{OC}^{(i)}} = 1.5$$

is satisfied. A feature value, indicating whether a difference between the maximum power point voltage of the remaining IV curve and the maximum power point voltage of the reference curve satisfies or does not satisfy a second preset requirement, is obtained according to whether the equation $$\frac{V_{mpp}^{(0)}}{V_{mpp}^{(0)} - V_{mpp}^{(i)}} = 3$$

or the equation $$\frac{V_{mpp}^{(0)}}{V_{mpp}^{(0)} - V_{mpp}^{(i)}} = 1.5$$

is satisfied. A feature value, indicating whether a first median iterative current in the right segment of the remaining IV curve is less than or is not less than a first median iterative reference current in the right segment of the reference curve, is obtained according to whether the inequality $I_{mn}^{(i)} < I_{mn}^{(0)}$ is satisfied. A feature value, indicating whether a second left median iterative current in the right segment of the remaining IV curve is the same as or is different from the first median iterative current, is obtained according to whether the equation $I_{rl2}^{(i)} = I_{mn}^{(i)}$ is satisfied. A feature value, indicating whether a second right median iterative current in the right segment of the remaining IV curve is the same as or is different from the first median iterative current, is obtained according to whether the equation $I_{rr2}^{(i)} = I_{mn}^{(i)}$ is satisfied. A feature value, indicating whether the second left median iterative current is greater than or is not greater than the first median iterative current, is obtained according to whether the inequality $I_{rl2}^{(i)} > I_{mn}^{(i)}$ is satisfied. A feature value, indicating whether the second right median iterative current is less than or is not less than the first median iterative current, is obtained according to whether the inequality $I_{rr2}^{(i)} < I_{mn}^{(i)}$ is satisfied. A feature value, indicating whether slopes of connection lines between any two of points corresponding to the second left median iterative current, the second right median iterative current and the first median iterative current in the remaining IV curve are the same or are different, is obtained according to whether the equation $|k_{2mn}^{(i)}| = |k_{22}^{(i)}| = |k_{mn2}^{(i)}|$ is satisfied. A feature value, indicating whether a line segment in the remaining IV curve from a point corresponding to the second left median iterative current to a point corresponding to the second right median iterative current has or does not have a convex drop characteristic, is obtained according to whether the inequality $|k_{mn2}^{(i)}| > |k_{22}^{(i)}| > |k_{2mn}^{(i)}|$ is satisfied. The second comparison result for the remaining IV curve can be obtained based on the logical combination of these feature values.

It should be noted that the determination of the respective feature values in the above content, such as the setting of the first preset requirement, the second preset requirement, and the convexity drop characteristic, is not limited to the above embodiment, and may be determined according to the specific application environment. FIG. 6a to FIG. 7b are only examples, which are not the only implementation manners of steps S122 and S123. All manners in which the corresponding comparison result can be generated to obtain the fault diagnosis result are all within the protection scope of the present application. In addition, the sequence of steps S122 and S123 is not limited, and may also be performed simultaneously.

Other principles are the same as those in the above embodiments, and are not described here.

A method for photovoltaic module fault diagnosis is further provided according to another embodiment of the present application. Based on the above embodiments and FIG. 1 to FIG. 7b, the step S103 of generating a fault diagnosis result for each of the photovoltaic modules based on the comparison results includes: for each of the photovoltaic modules, generating a fault diagnosis result for the photovoltaic module, about back-sheet failure, potential induced degradation, glass fragmentation, dust accumulation and conventional aging, based on the first comparison result for the remaining IV curve of the photovoltaic module; and generating a fault diagnostic result for the photovoltaic module, about solar cell interconnection failure, bypass diode failure, shading loss, severe glass fragmentation, hot spots and data distortion, based on the second comparison result for the remaining IV curve of the photovoltaic module.

The generating a fault diagnosis result for the photovoltaic module, about back-sheet failure, potential induced degradation, glass fragmentation, dust accumulation and conventional aging, based on the first comparison result for the remaining IV curve of the photovoltaic module includes follows cases.

The fault diagnosis result for the photovoltaic module is determined as back-sheet failure, if the first comparison result for the remaining IV curve of the photovoltaic module includes a case that the short circuit current of the remaining IV curve is the same as the short circuit current of the reference curve, a case that the open circuit voltage of the remaining IV curve is the same as the open circuit voltage of the reference curve, and a case that the slope of the first connection line of the remaining IV curve is different from the slope of the second connection line of the remaining IV curve.

The fault diagnosis result for the photovoltaic module is determined as potential induced degradation, if the first comparison result for the remaining IV curve of the photovoltaic module includes a case that the short circuit current of the remaining IV curve is different from the short circuit current of the reference curve, a case that the open circuit voltage of the remaining IV curve is different from the open circuit voltage of the reference curve, and a case that the slope of the first connection line of the remaining IV curve is different from the slope of the second connection line of the remaining IV curve.

The fault diagnosis result for the photovoltaic module is determined as glass fragmentation, if the first comparison result for the remaining IV curve of the photovoltaic module includes a case that the short circuit current of the remaining IV curve is different from the short circuit current of the reference curve, a case that the open circuit voltage of the remaining IV curve is the same as the open circuit voltage of the reference curve, and a case that the slope of the first connection line of the remaining IV curve is different from the slope of the second connection line of the remaining IV curve.

The fault diagnosis result for the photovoltaic module is determined as dust accumulation, if the first comparison result for the remaining IV curve of the photovoltaic module includes a case that the short circuit current of the remaining IV curve is different from the short circuit current of the reference curve, a case that the open circuit voltage of the remaining IV curve is the same as the open circuit voltage of the reference curve, a case that the slope of the first connection line of the remaining IV curve is the same as the slope of the second connection line of the remaining IV curve, and a case that the absolute value of the slope of the first connection line of the remaining IV curve is greater than the absolute value of the slope of the first connection line of the reference curve.

The fault diagnosis result for the photovoltaic module is determined as conventional aging, if the first comparison result for the remaining IV curve of the photovoltaic module includes a case that the short circuit current of the remaining IV curve is different from the short circuit current of the reference curve, a case that the open circuit voltage of the remaining IV curve is the same as the open circuit voltage of the reference curve, a case that the slope of the first connection line of the remaining IV curve is the same as the slope of the second connection line of the remaining IV curve, and a case that the absolute value of the slope of the first connection line of the remaining IV curve is not greater than the absolute value of the slope of the first connection line of the reference curve.

The generating a fault diagnostic result for the photovoltaic module, about solar cell interconnection failure, bypass diode failure, shading loss, severe glass fragmentation, hot spots and data distortion, based on the second comparison result for the remaining IV curve of the photovoltaic module includes following cases.

The fault diagnosis result for the photovoltaic module is determined as solar cell interconnection failure, if the second comparison result for the remaining IV curve of the photovoltaic module includes a case that the open circuit voltage of the remaining IV curve is less than the open circuit voltage of the reference curve, and a case that the difference between the open circuit voltage of the remaining IV curve and the open circuit voltage of the reference curve does not satisfy the first preset requirement.

The fault diagnosis result for the photovoltaic module is determined as bypass diode failure, if the second comparison result for the remaining IV curve of the photovoltaic module includes a case that the open circuit voltage of the remaining IV curve is less than the open circuit voltage of the reference curve, a case that the difference between the open circuit voltage of the remaining IV curve and the open circuit voltage of the reference curve satisfies the first preset requirement, and a case that the difference between the maximum power point voltage of the remaining IV curve and the maximum power point voltage of the reference curve satisfies the second preset requirement.

The fault diagnosis result for the photovoltaic module is determined as solar cell interconnection failure, if the second comparison result for the remaining IV curve of the photovoltaic module includes a case that the first median iterative current is not less than the first median iterative reference current, and a case that the difference between the open circuit voltage of the remaining IV curve and the open circuit voltage of the reference curve does not satisfy the first preset requirement.

The fault diagnosis result for the photovoltaic module is determined as bypass diode failure, if the second comparison result for the remaining IV curve of the photovoltaic module includes a case that the first median iterative current is not less than the first median iterative reference current, a case that the difference between the open circuit voltage of the remaining IV curve and the open circuit voltage of the reference curve satisfies the first preset requirement, and a case that the difference between the maximum power point voltage of the remaining IV curve and the maximum power point voltage of the reference curve satisfies the second preset requirement.

The fault diagnosis result for the photovoltaic module is determined as shading loss, if the second comparison result for the remaining IV curve of the photovoltaic module includes a case that the first median iterative current is less than the first median iterative reference current, and a case that the second left median iterative current is the same as the first median iterative current.

The fault diagnosis result for the photovoltaic module is determined as shading loss, if the second comparison result for the remaining IV curve of the photovoltaic module includes a case that the first median iterative current is less than the first median iterative reference current, and a case that the second right median iterative current is the same as the first median iterative current.

The fault diagnosis result for the photovoltaic module is determined as severe glass fragmentation, if the second comparison result for the remaining IV curve of the photovoltaic module includes a case that the first median iterative current is less than the first median iterative reference current, and a case that the second left median iterative current is not greater than the first median iterative current.

The fault diagnosis result for the photovoltaic module is determined as severe glass fragmentation, if the second comparison result for the remaining IV curve of the photovoltaic module includes a case that the first median iterative current is less than the first median iterative reference current, and a case that the second right median iterative current is not less than the first median iterative current.

The fault diagnosis result for the photovoltaic module is determined as hot spots, if the second comparison result for the remaining IV curve of the photovoltaic module includes a case that the first median iterative current is less than the first median iterative reference current, and a case that the slopes of the connection lines between any two of the points corresponding to the second left median iterative current, the second right median iterative current and the first median iterative current in the remaining IV curve are the same.

The fault diagnosis result for the photovoltaic module is determined as data distortion, if the second comparison result for the remaining IV curve of the photovoltaic module includes a case that the first median iterative current is less than the first median iterative reference current, and a case that the line segment in the remaining IV curve from the point corresponding to the second left median iterative current to the point corresponding to the second right median iterative current does not have the convex drop characteristic.

The fault diagnosis result for the photovoltaic module is determined as severe glass fragmentation, if the second comparison result for the remaining IV curve of the photovoltaic module includes a case that the first median iterative current is less than the first median iterative reference current, and a case that the line segment in the remaining IV curve from the point corresponding to the second left median iterative current to the point corresponding to the second right median iterative current has the convex drop characteristic.

Figure 6C:
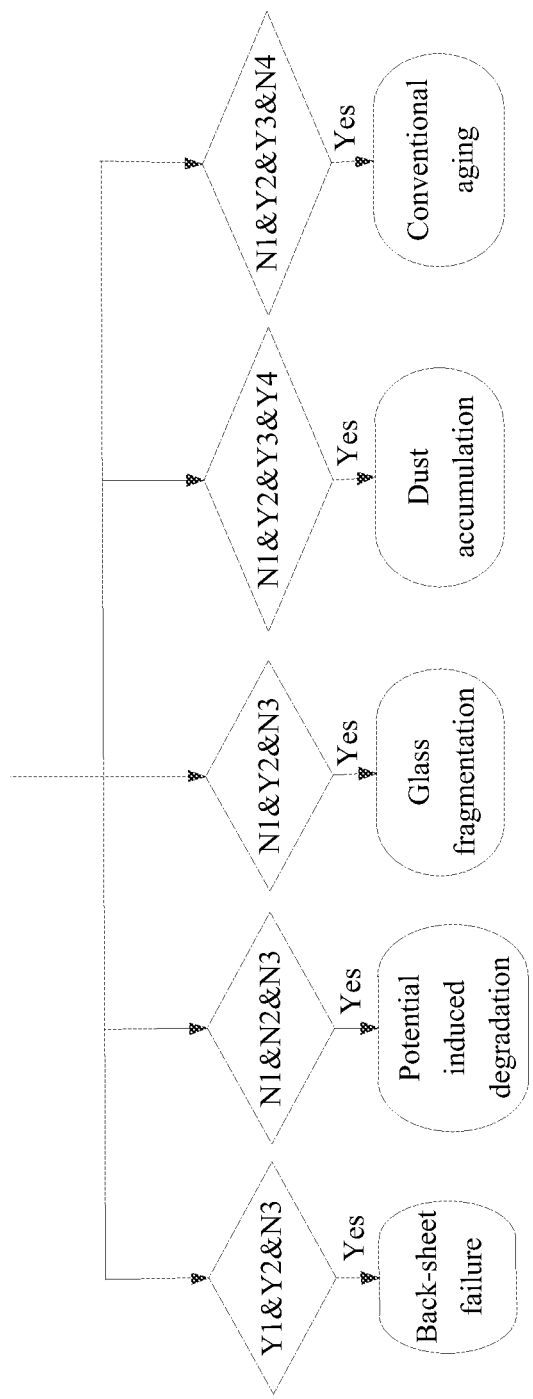
FIG. 6c is a schematic flow chart of the second part of a logic for performing photovoltaic module fault diagnosis for the test and analysis of the left segment according to an embodiment of the present disclosure.

The division manner shown in FIG. 6a is taken as an example. FIG. 6c is a schematic flow chart of the second part of a logic for performing photovoltaic module fault diagnosis for the test and analysis of the left segment according to an embodiment of the present disclosure. When the first comparison result is that the logical AND operation of the feature values $Y1(I_{SC}^{(i)}=I_{SC}^{(0)})$, $Y2(V_{OC}^{(i)}=V_{OC}^{(0)})$ and $N3(k_1^{(i)} \neq k_2^{(i)})$ is established, the fault diagnosis result for the photovoltaic module corresponding to the i-th curve is back-sheet failure. When the first comparison result is that the logical AND operation of the feature values $N1(I)_{SC}^{(i)} \neq I_{SC}^{(0)}$), $N2(V_{OC}^{(i)} \neq V_{OC}^{(0)})$ and $N3(k_1^{(i)} \neq k_2^{(i)})$ is established, the fault diagnosis result for the photovoltaic module corresponding to the i-th curve is potential induced degradation. When the first comparison result is that the logical AND operation of the feature values $N1(I_{SC}^{(i)} \neq I_{SC}^{(0)})$, $Y2(V_{OC}^{(i)}=V_{OC}^{(0)})$, and $N3(k_1^{(i)} \neq k_2^{(i)})$ is established, the fault diagnosis result for the photovoltaic module corresponding to the i-th curve is glass fragmentation. When the first comparison result is that the logical AND operation of the feature values $N1(I_{SC}^{(i)} \neq I_{SC}^{(0)})$, $Y2(V_{OC}^{(i)}=V_{OC}^{(0)})$, $Y3(k_1^{(i)}=k_2^{(i)})$ and $Y4(|k_1^{(i)}|>|k_1^{(0)}|)$ is established, the fault diagnosis result for the photovoltaic module corresponding to the i-th curve is dust accumulation. When the first comparison result is that the logical AND operation of the feature values $N1(I_{SC}^{(i)}=I_{SC}^{(0)})$, $Y2(V_{OC}^{(i)}=V_{OC}^{(0)})$, $Y3(k_1^{(i)}=k_2^{(i)})$, and $N4(|k_1^{(i)}| \leq |k_1^{(0)}|)$ is established, the fault diagnosis result of the photovoltaic module corresponding to the i-th curve is conventional aging.

The division manner shown in FIG. 7a is taken as an example. Referring to FIG. 7b, when the second comparison result is that the logical AND operation of $$V_{OC}^{(i)} < V_{OC}^{(0)}, \frac{V_{OC}^{(0)}}{V_{OC}^{(0)} - V_{OC}^{(i)}} \neq 3, \text{ and } \frac{V_{OC}^{(0)}}{V_{OC}^{(0)} - V_{OC}^{(i)}} \neq 1.5$$

is established, or when the second comparison result is that the logical AND operation of $$I_{mn}^{(i)} \geq I_{mn}^{(0)}, \frac{V_{OC}^{(0)}}{V_{OC}^{(0)} - V_{OC}^{(i)}} \neq 3, \text{ and } \frac{V_{OC}^{(0)}}{V_{OC}^{(0)} - V_{OC}^{(i)}} \neq 1.5$$

is established, the fault diagnosis result for the photovoltaic module corresponding to the i-th curve is solar cell interconnection failure. When the second comparison result is that the logical AND operation of $$V_{OC}^{(i)} < V_{OC}^{(0)}, \frac{V_{OC}^{(0)}}{V_{OC}^{(0)} - V_{OC}^{(i)}} = 3 \left( \text{or } \frac{V_{OC}^{(0)}}{V_{OC}^{(0)} - V_{OC}^{(i)}} = 1.5 \right) \text{ and } \frac{V_{mpp}^{(0)}}{V_{mpp}^{(0)} - V_{mpp}^{(i)}} = 3 \left( \text{or } \frac{V_{mpp}^{(0)}}{V_{mpp}^{(0)} - V_{mpp}^{(i)}} = 1.5 \right)$$

is established, or when the second comparison result is that the logical AND operation of $$I_{mn}^{(i)} \geq I_{mn}^{(0)}, \frac{V_{OC}^{(0)}}{V_{OC}^{(0)} - V_{OC}^{(i)}} = 3 \left( \text{or } \frac{V_{OC}^{(0)}}{V_{OC}^{(0)} - V_{OC}^{(i)}} = 1.5 \right) \text{ and } \frac{V_{mpp}^{(0)}}{V_{mpp}^{(0)} - V_{mpp}^{(i)}} = 3 \left( \text{or } \frac{V_{mpp}^{(0)}}{V_{mpp}^{(0)} - V_{mpp}^{(i)}} = 1.5 \right)$$

is established, the fault diagnosis result for the photovoltaic module corresponding to the i-th curve is bypass diode failure. When the second comparison result is that the logical AND operation of $I_{mn}^{(i)}<I_{mn}^{(0)}$ and $I_{rr2}^{(i)}=I_{mn}^{(i)}$ is established, or when the second comparison result is that the logical AND operation of if $I_{mn}^{(i)}<I_{mn}^{(0)}$ and $I_{rr2}^{(i)}=I_{mn}^{(i)}$ is established, the fault diagnosis result for the photovoltaic module corresponding to the i-th curve is shading loss. When the second comparison result is that the logical AND operation of $I_{mn}^{(i)}<I_{mn}^{(0)}$ and $I_{rr2}^{(i)} \leq I_{mn}^{(i)}$ is established, or when the second comparison result is that the logical AND operation of $I_{mn}^{(i)}<I_{mn}^{(0)}$ and $I_{rr2}^{(i)} \geq I_{mn}^{(i)}$ is established, the fault diagnosis result for the photovoltaic module corresponding to the i-th curve is severe glass fragmentation. When the second comparison result is that the logical AND operation of $I_{2mn}^{(i)}<I_{mn}^{(0)}$ and $|k_{2mn}^{(i)}|=|k_{22}^{(i)}|=|k_{mn2}^{(i)}|$ is established, the fault diagnosis result for the photovoltaic module corresponding to the i-th curve is hot spots. When the second comparison result is that $I_{mn}^{(i)}<I_{mn}^{(0)}$ is satisfied and $|k_{mn2}^{(i)}|>|k_{22}^{(i)}|>|k_{2mn}^{(i)}|$ is not satisfied, the fault diagnosis result for the photovoltaic module corresponding to the i-th curve is data distortion.

FIG. 6b and FIG. 7b show only examples of the application in the above-mentioned partitioning and division manner, and are not limited thereto. The conditions may be modified according to the specific application environment, and all of them are within the protection scope of the present application.

Other principles are the same as those in the above embodiment, and are not described here.

A method for photovoltaic module fault diagnosis is further provided according to another embodiment of the present application. Based on the above embodiments and FIG. 1 to FIG. 7b, the method, after the step S103 of generating a fault diagnosis result for each of the photovoltaic modules based on the comparison results, further includes: for each of the remaining IV curves, calculating a minimum power loss of the remaining IV curve based on a maximum output power of the reference curve and a maximum output power of the remaining IV curve, where an inverter or a cloud service platform generates and outputs a module suspend command according to the minimum power loss, and the module suspend command is used to control the module-level power electronic device connected to the photovoltaic module having the remaining IV curve to be disconnected from or isolated from the photovoltaic module connected to the module-level power electronic device.

In practice, such as when a hot spot fault occurs, a reasonable threshold may be set to be compared with the minimum power loss dissipation. If the minimum power loss dissipation is greater than the threshold, the inverter automatically processes the fault locally by edge calculation technology, or the inverter uploads the fault to the cloud service platform. Then, the module suspend command is used to control the module-level power electronic device connected to the faulty module to be disconnected or isolated from the faulty module, to wait for the removal and replacement of the faulty module.

It should be noted that in the fault processing of photovoltaic system in the conventional technology, it is mainly based on pure manual inspection, or after the fault is uploaded to the cloud service platform, an instruction is sent to the operation and maintenance personnel to go to the site for processing, and no automatic processing is implemented. With the method for photovoltaic module fault diagnosis provided according to the present embodiment, the local automatic processing for the faulty module can be directly implemented by the inverter, or the remote automated processing of the faulty module can be realized by the cloud service platform. Moreover, local automation processing can also reduce the time delay of the communication and waiting for instructions between the underlying device and the cloud service platform, thereby reducing the loss of the photovoltaic system due to the failure of the photovoltaic module.

Other principles are the same as those in the above embodiments, and are not described here.

An edge calculation processing device is further provided according to another embodiment of the present application, which is configured to perform the method for photovoltaic module fault diagnosis described in any of the above embodiments. For the specific principle of the method for photovoltaic module fault diagnosis, the above embodiments may be referred, and the details are not described herein.

The edge calculation processing device is arranged at any position in the photovoltaic power generation system. For example, the edge calculation processing device may be integrated in the controller of the inverter, or the edge calculation processing device may also be separately arranged and connected with each module-level power electronic device for communication, as long as the method for photovoltaic module fault diagnosis can be realized.

An inverter is further provided according to another embodiment of the present application, which includes a main circuit, a controller, a detecting device. The inverter is different from the inverter in the conventional technology in that, the controller of the inverter is provided with the edge calculation processing device as described in the above embodiments, and the edge calculation processing device is configured to perform the method for photovoltaic module fault diagnosis described in any of the above embodiments. For the specific principle of the method for photovoltaic module fault diagnosis, the above embodiments may be referred, and the details are not described herein.

In practice, the edge calculation processing device, in the controller of the inverter, may be implemented in the form of a chip, which is mainly configured to perform the method for photovoltaic module fault diagnosis. For the control and communication of each module-level power electronic device, it can be implemented by the original part of the controller, which is not specifically limited herein.

The various embodiments of the present disclosure are described in a progressive manner, and each embodiment focuses on differences from other embodiments, and the same or similar parts between the various embodiments may be referred to each other. For the device disclosed in the embodiments, since the principle is the same as the method disclosed in the embodiments, the description is relatively simple, and the relevant parts can be referred to the method part.

The above are only preferred embodiments of the present disclosure, and are not intended to limit the disclosure in any way. Although the present disclosure has been disclosed above in the preferred embodiments, it is not intended to limit the disclosure. Those skilled in the art, without departing from the technical solutions of the present disclosure, can make many possible variations and modifications to the technical solutions of the present disclosure or modify them into equivalent embodiments by using the methods and technical contents disclosed above. These variations and modifications and equivalent embodiments also fall into the scope of the present disclosure.

The invention claimed is:

1. A method for photovoltaic module fault diagnosis, comprising:

after a plurality of module-level power electronic devices are controlled to perform IV scanning on photovoltaic modules connected to the plurality of module-level power electronic devices respectively and IV curves of the photovoltaic modules are obtained by the plurality of module-level power electronic devices respectively, selecting, from the IV curves of the photovoltaic modules, an IV curve satisfying a condition as a reference curve;

comparing each of remaining IV curves in the IV curves of the photovoltaic modules other than the reference curve with the reference curve, to generate comparison results; and generating a fault diagnosis result for each of the photovoltaic modules based on the comparison results.

2. The method for photovoltaic module fault diagnosis according to claim 1, wherein the selecting, from the IV curves of the photovoltaic modules, an IV curve satisfying a condition as a reference curve comprises:

determining whether the IV curves of the photovoltaic modules comprise an IV curve satisfying a power output requirement;

performing the operation of selecting, from the IV curves of the photovoltaic modules, an IV curve satisfying a condition as a reference curve after a test condition is changed and the plurality of module-level power electronic devices are controlled to perform IV scanning on the photovoltaic modules connected to the plurality of module-level power electronic devices respectively and IV curves of the photovoltaic modules are obtained by the plurality of module-level power electronic devices respectively, in a case that the IV curves of the photovoltaic modules do not comprise the IV curve satisfying the power output requirement;

recording the IV curve satisfying the power output requirement as an asterisk curve, in a case that the IV curves of the photovoltaic modules comprise the IV curve satisfying the power output requirement;

determining whether the asterisk curve satisfies a current stability requirement;

performing the operation of selecting, from the IV curves of the photovoltaic modules, an IV curve satisfying a condition as a reference curve after a test condition is changed and the plurality of module-level power electronic devices are controlled to perform IV scanning on the photovoltaic modules connected to the plurality of module-level power electronic devices respectively and IV curves of the photovoltaic modules are obtained by the plurality of module-level power electronic devices respectively, in a case that the asterisk curve does not satisfy the current stability requirement; and taking the asterisk curve as the reference curve, in a case that the asterisk curve satisfies the current stability requirement.

3. The method for photovoltaic module fault diagnosis according to claim 2, wherein the determining whether the IV curves of the photovoltaic modules comprise an IV curve satisfying a power output requirement comprises:

determining whether an IV curve with a greatest fill factor has a greatest maximum output power;

taking the IV curve with the greatest fill factor as the IV curve satisfying the power output requirement, in a case that the IV curve with the greatest fill factor has the greatest maximum output power;

determining whether a maximum output power of the IV curve with the greatest fill factor satisfies a ranking requirement, in a case that the IV curve with the greatest fill factor does not have the greatest maximum output power;

taking the IV curve with the greatest fill factor as the IV curve satisfying the power output requirement, in a case that the maximum output power of the IV curve with the greatest fill factor satisfies the ranking requirement; and determining that the IV curves of the photovoltaic modules do not comprise the IV curve satisfying the power output requirement, in a case that the maximum output power of the IV curve with the greatest fill factor does not satisfy the ranking requirement.

4. The method for photovoltaic module fault diagnosis according to claim 2, wherein the determining whether the asterisk curve satisfies a current stability requirement comprises:

determining whether a slope of a first line segment on the asterisk curve is stable and is zero;

determining that the asterisk curve satisfies the current stability requirement, in a case that the slope of the first line segment is stable and is zero;

determining whether a current change of a second line segment on the asterisk curve satisfies a current change requirement, in a case that the slope of the first line segment is stable and is not zero;

determining that the asterisk curve satisfies the current stability requirement, in a case that the current change of the second line segment satisfies the current change requirement; and determining that the asterisk curve does not satisfy the current stability requirement, in a case that the current change of the second line segment does not satisfy the current change requirement or in a case that the slope of the first line segment is not stable.

5. The method for photovoltaic module fault diagnosis according to claim 1, wherein the comparing each of remaining IV curves in the IV curves of the photovoltaic modules other than the reference curve with the reference curve, to generate comparison results comprises:

for each of the remaining IV curves, dividing each of the reference curve and the remaining IV curve into a left segment and a right segment along a current line on which a maximum power point of the reference curve is located;

generating a first comparison result for the remaining IV curve by performing comparison based on a short circuit current, an open circuit voltage and a slope of a first connection line in the left segment of the reference curve, and a short circuit current, an open circuit voltage, a slope of a first connection line and a slope of a second connection line in the left segment of the remaining IV curve; and generating a second comparison result for the remaining IV curve by performing comparison based on the open circuit voltage and a maximum power point voltage of the reference curve, and the open circuit voltage, a maximum power point voltage and a median iterative current in the right segment of the remaining IV curve.

6. The method for photovoltaic module fault diagnosis according to claim 5, wherein the first comparison result for the remaining IV curve comprises:

a case that the short circuit current of the remaining IV curve is the same as or is different from the short circuit current of the reference curve;

a case that the open circuit voltage of the remaining IV curve is the same as or is different from the open circuit voltage of the reference curve;

a case that the slope of the first connection line of the remaining IV curve is the same as or is different from the slope of the second connection line of the remaining IV curve; and a case that an absolute value of the slope of the first connection line of the remaining IV curve is greater than or is not greater than an absolute value of the slope of the first connection line of the reference curve; and the second comparison result for the remaining IV curve comprises:

a case that the open circuit voltage of the remaining IV curve is less than or is not less than the open circuit voltage of the reference curve;

a case that a difference between the open circuit voltage of the remaining IV curve and the open circuit voltage of the reference curve satisfies or does not satisfy a first preset requirement;

a case that a difference between the maximum power point voltage of the remaining IV curve and the maximum power point voltage of the reference curve satisfies or does not satisfy a second preset requirement;

a case that a first median iterative current in the right segment of the remaining IV curve is less than or is not less than a first median iterative reference current in the right segment of the reference curve;

a case that a second left median iterative current in the right segment of the remaining IV curve is the same as or is different from the first median iterative current;

a case that a second right median iterative current in the right segment of the remaining IV curve is the same as or is different from the first median iterative current;

a case that the second left median iterative current is greater than or is not greater than the first median iterative current;

a case that the second right median iterative current is less than or is not less than the first median iterative current;

a case that slopes of connection lines between any two of points corresponding to the second left median iterative current, the second right median iterative current and the first median iterative current in the remaining IV curve are the same or are different; and a case that a line segment in the remaining IV curve from a point corresponding to the second left median iterative current to a point corresponding to the second right median iterative current has or does not have a convex drop characteristic.

7. The method for photovoltaic module fault diagnosis according to claim 6, wherein the generating a fault diagnosis result for each of the photovoltaic modules based on the comparison results comprises:

for each of the photovoltaic modules, generating a fault diagnosis result for the photovoltaic module, about back-sheet failure, potential induced degradation, glass fragmentation, dust accumulation and conventional aging, based on the first comparison result for the remaining IV curve of the photovoltaic module; and generating a fault diagnostic result for the photovoltaic module, about solar cell interconnection failure, bypass diode failure, shading loss, severe glass fragmentation, hot spots and data distortion, based on the second comparison result for the remaining IV curve of the photovoltaic module.

8. The method for photovoltaic module fault diagnosis according to claim 7, wherein the generating a fault diagnosis result for the photovoltaic module, about back-sheet failure, potential induced degradation, glass fragmentation, dust accumulation and conventional aging, based on the first comparison result for the remaining IV curve of the photovoltaic module comprises:

determining a fault diagnosis result for the photovoltaic module as back-sheet failure, if the first comparison result for the remaining IV curve of the photovoltaic module comprises a case that the short circuit current of the remaining IV curve is the same as the short circuit current of the reference curve, a case that the open circuit voltage of the remaining IV curve is the same as the open circuit voltage of the reference curve, and a case that the slope of the first connection line of the remaining IV curve is different from the slope of the second connection line of the remaining IV curve;

determining a fault diagnosis result for the photovoltaic module as potential induced degradation, if the first comparison result for the remaining IV curve of the photovoltaic module comprises a case that the short circuit current of the remaining IV curve is different from the short circuit current of the reference curve, a case that the open circuit voltage of the remaining IV curve is different from the open circuit voltage of the reference curve, and a case that the slope of the first connection line of the remaining IV curve is different from the slope of the second connection line of the remaining IV curve;

determining a fault diagnosis result for the photovoltaic module as glass fragmentation, if the first comparison result for the remaining IV curve of the photovoltaic module comprises a case that the short circuit current of the remaining IV curve is different from the short circuit current of the reference curve, a case that the open circuit voltage of the remaining IV curve is the same as the open circuit voltage of the reference curve, and a case that the slope of the first connection line of the remaining IV curve is different from the slope of the second connection line of the remaining IV curve;

determining a fault diagnosis result for the photovoltaic module as dust accumulation, if the first comparison result for the remaining IV curve of the photovoltaic module comprises a case that the short circuit current of the remaining IV curve is different from the short circuit current of the reference curve, a case that the open circuit voltage of the remaining IV curve is the same as the open circuit voltage of the reference curve, a case that the slope of the first connection line of the remaining IV curve is the same as the slope of the second connection line of the remaining IV curve, and a case that the absolute value of the slope of the first connection line of the remaining IV curve is greater than the absolute value of the slope of the first connection line of the reference curve; and determining a fault diagnosis result for the photovoltaic module as conventional aging, if the first comparison result for the remaining IV curve of the photovoltaic module comprises a case that the short circuit current of the remaining IV curve is different from the short circuit current of the reference curve, a case that the open circuit voltage of the remaining IV curve is the same as the open circuit voltage of the reference curve, a case that the slope of the first connection line of the remaining IV curve is the same as the slope of the second connection line of the remaining IV curve, and a case that the absolute value of the slope of the first connection line of the remaining IV curve is not greater than the absolute value of the slope of the first connection line of the reference curve.

9. The method for photovoltaic module fault diagnosis according to claim 7, wherein the generating a fault diagnostic result for the photovoltaic module, about solar cell interconnection failure, bypass diode failure, shading loss, severe glass fragmentation, hot spots and data distortion, based on the second comparison result for the remaining IV curve of the photovoltaic module comprises:

determining a fault diagnosis result for the photovoltaic module as solar cell interconnection failure, if the second comparison result for the remaining IV curve of the photovoltaic module comprises a case that the open circuit voltage of the remaining IV curve is less than the open circuit voltage of the reference curve, and a case that the difference between the open circuit voltage of the remaining IV curve and the open circuit voltage of the reference curve does not satisfy the first preset requirement;

determining a fault diagnosis result for the photovoltaic module as bypass diode failure, if the second comparison result for the remaining IV curve of the photovoltaic module comprises a case that the open circuit voltage of the remaining IV curve is less than the open circuit voltage of the reference curve, a case that the difference between the open circuit voltage of the remaining IV curve and the open circuit voltage of the reference curve satisfies the first preset requirement, and a case that the difference between the maximum power point voltage of the remaining IV curve and the maximum power point voltage of the reference curve satisfies the second preset requirement;

determining a fault diagnosis result for the photovoltaic module as solar cell interconnection failure, if the second comparison result for the remaining IV curve of the photovoltaic module comprises a case that the first median iterative current is not less than the first median iterative reference current, and a case that the difference between the open circuit voltage of the remaining IV curve and the open circuit voltage of the reference curve does not satisfy the first preset requirement;

determining a fault diagnosis result for the photovoltaic module as bypass diode failure, if the second comparison result for the remaining IV curve of the photovoltaic module comprises a case that the first median iterative current is not less than the first median iterative reference current, a case that the difference between the open circuit voltage of the remaining IV curve and the open circuit voltage of the reference curve satisfies the first preset requirement, and a case that the difference between the maximum power point voltage of the remaining IV curve and the maximum power point voltage of the reference curve satisfies the second preset requirement;

determining a fault diagnosis result for the photovoltaic module as shading loss, if the second comparison result for the remaining IV curve of the photovoltaic module comprises a case that the first median iterative current is less than the first median iterative reference current, and a case that the second left median iterative current is the same as the first median iterative current;

determining a fault diagnosis result for the photovoltaic module as shading loss, if the second comparison result for the remaining IV curve of the photovoltaic module comprises a case that the first median iterative current is less than the first median iterative reference current, and a case that the second right median iterative current is the same as the first median iterative current;

determining a fault diagnosis result for the photovoltaic module as severe glass fragmentation, if the second comparison result for the remaining IV curve of the photovoltaic module comprises a case that the first median iterative current is less than the first median iterative reference current, and a case that the second left median iterative current is not greater than the first median iterative current;

determining a fault diagnosis result for the photovoltaic module as severe glass fragmentation, if the second comparison result for the remaining IV curve of the photovoltaic module comprises a case that the first median iterative current is less than the first median iterative reference current, and a case that the second right median iterative current is not less than the first median iterative current;

determining a fault diagnosis result for the photovoltaic module as hot spots, if the second comparison result for the remaining IV curve of the photovoltaic module comprises a case that the first median iterative current is less than the first median iterative reference current, and a case that the slopes of the connection lines between any two of the points corresponding to the second left median iterative current, the second right median iterative current and the first median iterative current in the remaining IV curve are the same;

determining a fault diagnosis result for the photovoltaic module as data distortion, if the second comparison result for the remaining IV curve of the photovoltaic module comprises a case that the first median iterative current is less than the first median iterative reference current, and a case that the line segment in the remaining IV curve from the point corresponding to the second left median iterative current to the point corresponding to the second right median iterative current does not have the convex drop characteristic; and determining a fault diagnosis result for the photovoltaic module as severe glass fragmentation, if the second comparison result for the remaining IV curve of the photovoltaic module comprises a case that the first median iterative current is less than the first median iterative reference current, and a case that the line segment in the remaining IV curve from the point corresponding to the second left median iterative current to the point corresponding to the second right median iterative current has the convex drop characteristic.

10. The method for photovoltaic module fault diagnosis according to claim 1, after generating the fault diagnosis result for each of the photovoltaic modules based on the comparison results, further comprising:

for each of the remaining IV curves, calculating a minimum power loss of the remaining IV curve based on a maximum output power of the reference curve and a maximum output power of the remaining IV curve, wherein an inverter or a cloud service platform generates and outputs a module suspend command according to the minimum power loss, and the module suspend command is used to control the module-level power electronic device connected to the photovoltaic module having the remaining IV curve to be disconnected from or isolated from the photovoltaic module connected to the module-level power electronic device.

11. An edge calculation processing device comprising:
a memory storing program instructions; and
a processor executes the program instructions to perform a method for photovoltaic module fault diagnosis, the method comprising:
after a plurality of module-level power electronic devices are controlled to perform IV scanning on photovoltaic modules connected to the plurality of module-level power electronic devices respectively and IV curves of the photovoltaic modules are obtained by the plurality of module-level power electronic devices respectively, selecting, from the IV curves of the photovoltaic modules, an IV curve satisfying a condition as a reference curve;
comparing each of remaining IV curves in the IV curves of the photovoltaic modules other than the reference curve with the reference curve, to generate comparison results; and
generating a fault diagnosis result for each of the photovoltaic modules based on the comparison results.

12. An inverter, comprising:
a controller, wherein the controller comprises an edge calculation processing device, wherein the edge calculation processing device comprises:
a memory storing program instructions; and
a processor executes the program instructions to perform a method for photovoltaic module fault diagnosis, wherein the method comprises:
after a plurality of module-level power electronic devices are controlled to perform IV scanning on photovoltaic modules connected to the plurality of module-level power electronic devices respectively and IV curves of the photovoltaic modules are obtained by the plurality of module-level power electronic devices respectively, selecting, from the IV curves of the photovoltaic modules, an IV curve satisfying a condition as a reference curve;
comparing each of remaining IV curves in the IV curves of the photovoltaic modules other than the reference curve with the reference curve, to generate comparison results; and
generating a fault diagnosis result for each of the photovoltaic modules based on the comparison results.

* * * * *